(12) United States Patent
Kono et al.

(10) Patent No.: US 12,365,541 B2
(45) Date of Patent: Jul. 22, 2025

(54) ARTICLE TRANSPORT FACILITY, ROUTE SETTING METHOD, AND ROUTE SETTING PROGRAM

(71) Applicant: Daifuku Co., Ltd., Osaka (JP)

(72) Inventors: Makoto Kono, Komaki (JP); Keisuke Takeno, Komaki (JP); Kazuhiro Iwamitsu, Komaki (JP)

(73) Assignee: Daifuku Co., Ltd., Osaka (JP)

( * ) Notice: Subject to any disclaimer, the term of this patent is extended or adjusted under 35 U.S.C. 154(b) by 762 days.

(21) Appl. No.: 17/726,928

(22) Filed: Apr. 22, 2022

(65) Prior Publication Data
US 2022/0348410 A1 Nov. 3, 2022

(30) Foreign Application Priority Data
Apr. 23, 2021 (JP) ................. 2021-073567

(51) Int. Cl.
*B65G 1/137* (2006.01)
*G05D 1/00* (2024.01)
*G06Q 10/047* (2023.01)

(52) U.S. Cl.
CPC ......... *B65G 1/1373* (2013.01); *G05D 1/0217* (2013.01); *G05D 1/0287* (2013.01); *G06Q 10/047* (2013.01)

(58) Field of Classification Search
CPC ............... B65G 1/1373; B65G 1/0492; G06Q 10/047; G06Q 10/06; Y02P 90/02; H01L 21/67733; G05D 1/00
See application file for complete search history.

(56) References Cited

U.S. PATENT DOCUMENTS

| 5,625,559 | A  | * | 4/1997 | Egawa | G05D 1/0274 |
| | | | | | 701/117 |
| 6,285,951 | B1 | * | 9/2001 | Gaskins | G05D 1/0217 |
| | | | | | 73/178 R |
| 7,194,332 | B2 | * | 3/2007 | Fukunari | G03F 7/7075 |
| | | | | | 700/228 |
| 11,114,323 | B2 | | 9/2021 | Ogawa et al. | |
| 2019/0122910 | A1 | | 4/2019 | Ogawa et al. | |
| 2020/0207230 | A1 | * | 7/2020 | Evans | H02J 50/10 |

FOREIGN PATENT DOCUMENTS

| JP | 2011102166 A | * | 5/2011 |
| JP | 2018169717 A | * | 11/2018 |
| JP | 201980411 A | | 5/2019 |
| JP | 2020030724 A | * | 2/2020 |

* cited by examiner

*Primary Examiner* — Jacob S. Scott
*Assistant Examiner* — Erin Morris
(74) *Attorney, Agent, or Firm* — The Webb Law Firm

(57) ABSTRACT

A reference cost and a variable cost are included in a link cost for setting a set route for causing a setting vehicle to travel to a destination on a travelable route. A controller obtains an adjusted other vehicle cost by adjusting another vehicle cost with use of a separation adjustment value set smaller the higher a separation index is, obtains a variable cost based on a sum of the adjusted other vehicle costs of all target other vehicles, determines a link cost for each link in a candidate route, which is a candidate for a set route for the setting vehicle, based on the variable cost and the reference cost, obtains a route cost for each candidate route based on the link costs, and sets a set route based on the route costs of the candidate routes.

10 Claims, 10 Drawing Sheets

ARTICLE TRANSPORT FACILITY, ROUTE SETTING METHOD, AND ROUTE SETTING PROGRAM

CROSS-REFERENCE TO RELATED APPLICATION

This application claims priority to Japanese Patent Application No. 2021-073567 filed Apr. 23, 2021, the disclosure of which is hereby incorporated by reference in its entirety.

BACKGROUND OF THE INVENTION

1. Field of the Invention

The present invention relates to an article transport facility provided with article transport vehicles that travel along a specified travelable route and transport articles and a controller for controlling the article transport vehicles, and also relates to a route setting method and a route setting program for route setting in the article transport facility.

2. Description of the Related Art

JP 2019-080411A discloses a known example of such an article transport facility. The controller of this article transport facility executes route setting control for setting a set route, which is a route for traveling of the article transport vehicle from the current position to a destination on a travelable route. For example, in the case of transporting an article from a transport source to a transport destination, if the article transport vehicle is present at a position corresponding to the transport source, the controller performs the route setting control so as to set the set route such that a position corresponding to the transport source is the current position and a position corresponding to the transport destination is the destination.

SUMMARY OF THE INVENTION

In the above-described article transport facility, when setting the set route in the route setting control as described above, there may be a plurality of candidate routes that are candidates for the set route from the current position of the article transport vehicle to the destination. In such a case, in the route setting control, the controller may determine the set route to be the candidate route that has the shortest route length among the plurality of candidate routes. However, even if the set route is set in this way, another candidate route that was not set as the set route may reach the destination in a shorter time than the set route due to the presence of many other article transport vehicles on the set route. As described above, if the set route is set based on a uniform setting criterion, a route that reaches the destination in a shorter time among the plurality of candidate routes may not be able to be set as the set route.

In view of this, there is desire for a technique that makes it possible to easily increase the likelihood that a route that reaches a destination in a shorter time among a plurality of candidate routes can be set as the set route.

In view of the foregoing, an article transport facility according to an aspect of the present invention includes a plurality of article transport vehicles configured to transport articles while traveling along a specified travelable route; and a controller configured to control the article transport vehicles, wherein the travelable route includes a plurality of nodes at which a route branches or routes merge, and a plurality of links that are each a route portion connecting a pair of nodes, the controller executes route setting control to set a set route based on a link cost set for each of the links, the set route being a route along which a setting vehicle, which is one of the plurality of article transport vehicles, travels to a destination on the travelable route, each of the link costs includes a reference cost and a variable cost, with a target vehicle being any one article transport vehicle that passes through a link, a target link being the link through which the target vehicle passes, and another vehicle being an article transport vehicle other than the target vehicle, the reference cost is a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, in the route setting control, the controller obtains an adjusted other vehicle cost by adjusting the reference other vehicle cost using the separation adjustment value for each target other vehicle, obtains the variable cost based on a sum of the adjusted other vehicle costs of all target other vehicles, determines the link cost for each link in a candidate route based on the variable cost and the reference cost, the candidate route being a candidate for the set route from the position of the setting vehicle at the setting time to the destination, obtains a route cost for each candidate route based on the link costs, and sets the set route based on the route cost of each candidate route.

According to this configuration, the target other vehicle is another vehicle for which a set route passing through the target link after the setting time has been set, and therefore the influence of not only other vehicles present in the target link at the setting time but also other vehicles that will be present in the target link in the future when the setting vehicle passes through the target link can be given consideration when obtaining the variable cost. Due to the reference other vehicle cost of the target other vehicle being reflected in the variable cost, it is possible to obtain a variable cost that is based on the state of the target link at a time point before the setting time. However, the farther the position of the target other vehicle at the setting time is from the target link, there is a gradually increasing likelihood that the set route of the target other vehicle will be changed to a route that does not pass through the target link due to a change in the situation before the target other vehicle reaches the target link. According to the above configuration, the adjusted other vehicle cost is obtained by adjusting the reference other vehicle cost with use of the separation adjustment value, which is a value that decreases with an increase in a separation index regarding the route from position of the target other vehicle at the setting time to the target link, and the variable cost is obtained based on a sum of the adjusted other vehicle costs for all of the target other vehicles, and therefore the variable cost can be obtained more appropriately with consideration given to the possibility of a future change in the set route of a target other vehicle. This therefore makes it easier to raise the likelihood that the set route can be set to a route that reaches the destination in a short time from among a plurality of candidate routes.

Various technical features of the article transport facility described above can also be applied to a route setting method or a route setting program in an article transport facility. The following illustrates a representative embodiment. For example, the route setting method can include various steps that have the features of the article transport facility described above. Also, the route setting program can cause a controller, which is a computer, to realize various functions having the features of the article transport facility described above. As a matter of course, the route setting method and the route setting program can also achieve the operations and effects of the article transport facility described above. Furthermore, as a preferred aspect of the article transport facility, various additional features illustrated in the following description of embodiments can also be incorporated into the route setting method and the route setting program, and the method and the program can also achieve operations and effects that correspond to the additional features.

As one preferred aspect, a route setting method is for, in an article transport facility that includes a plurality of article transport vehicles that transport articles while traveling along a specified travelable route and a controller that controls the article transport vehicles, setting a set route for causing a setting vehicle, which is one of the article transport vehicles, to travel to a destination on the travelable route, by causing the controller to execute route setting control, the travelable route including a plurality of nodes at which a route branches or routes merge, and a plurality of links that are each a route portion connecting a pair of nodes, a link cost set for each of the links including a reference cost and a variable cost, with a target vehicle being any one article transport vehicle that passes through a link, a target link being the link through which the target vehicle passes, and another vehicle being an article transport vehicle other than the target vehicle, the reference cost being a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, the route setting method including: a step of obtaining an adjusted other vehicle cost for each target other vehicle with use of the reference other vehicle cost and the separation adjustment value; a step of obtaining the variable cost based on a sum of the adjusted other vehicle costs of all target other vehicles; a step of determining the link cost for each link in a candidate route based on the variable cost and the reference cost, the candidate route being a candidate for the set route from the position of the setting vehicle at the setting time to the destination; and obtaining a route cost for each candidate route based on the link costs, and setting the set route based on the route cost of each candidate route.

Also, as another preferred aspect, a route setting program is for, in an article transport facility that includes a plurality of article transport vehicles that transport articles while traveling along a specified travelable route and a controller that controls the article transport vehicles, causing the controller to realize a function for setting a set route for causing a setting vehicle, which is one of the article transport vehicles, to travel to a destination on the travelable route, by execution of route setting control by the controller, the travelable route including a plurality of nodes at which a route branches or routes merge, and a plurality of links that are each a route portion connecting a pair of nodes, a link cost set for each of the links including a reference cost and a variable cost, with a target vehicle being any one article transport vehicle that passes through a link, a target link being the link through which the target vehicle passes, and another vehicle be an article transport vehicle other than the target vehicle, the reference cost being a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, the route setting program causing the controller to realize: a function of obtaining an adjusted other vehicle cost for each target other vehicle with use of the reference other vehicle cost and the separation adjustment value; a function of obtaining the variable cost based on a sum of the adjusted other vehicle costs of all target other vehicles; a function of determining the link cost for each link in a candidate route based on the variable cost and the reference cost, the candidate route being a candidate for the set route from the position of the setting vehicle at the setting time to the destination; and a function of obtaining a route cost for each candidate route based on the link costs, and setting the set route based on the route cost of each candidate route.

Further features and advantages of an article transport facility as well as a route setting method and a route setting program for route setting in the article transport facility will become apparent from the following description of exemplary and non-limiting embodiments given with reference to the drawings.

DESCRIPTION OF THE INVENTION

Figure 1:
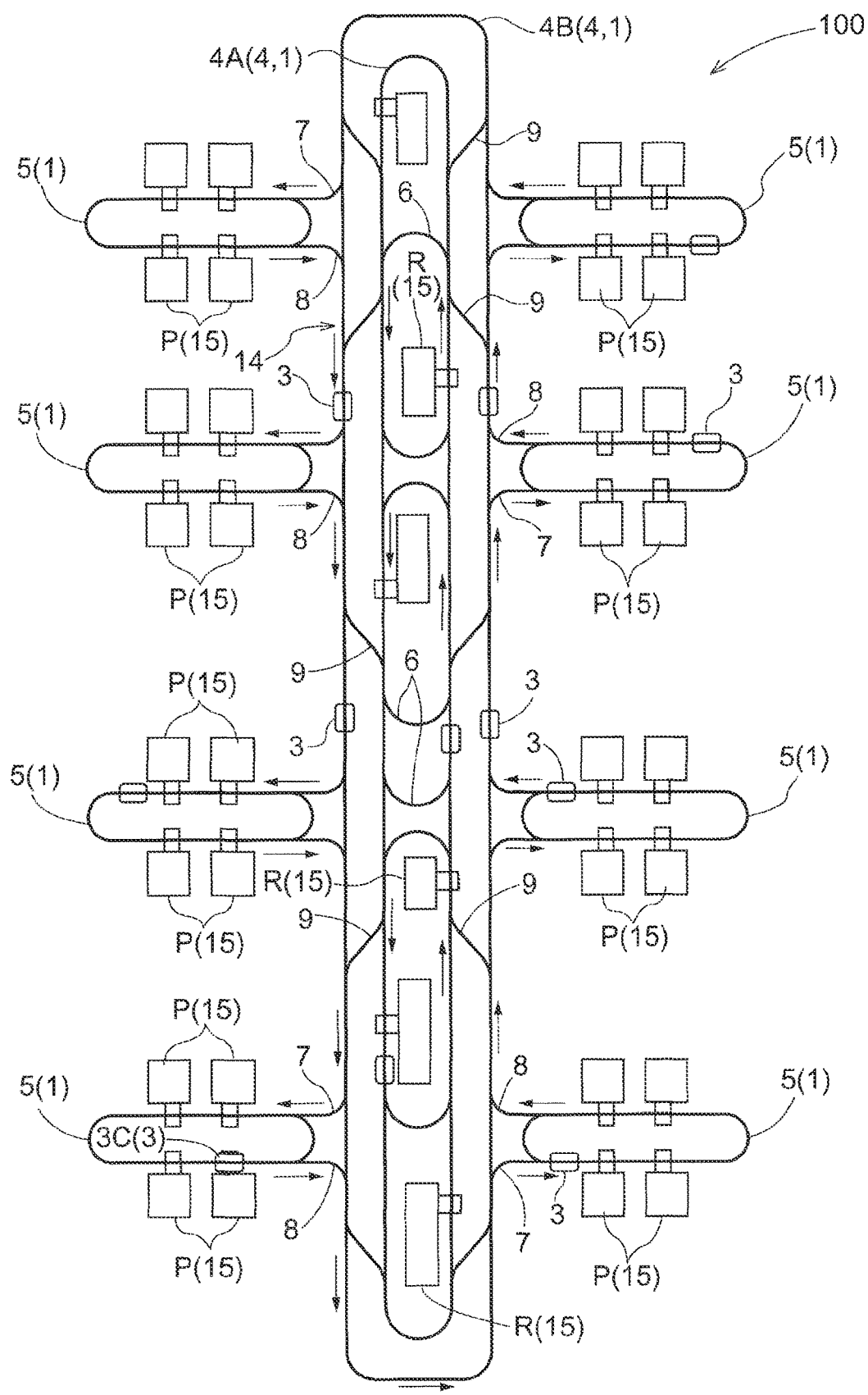
FIG. 1 is a plan view of an article transport facility.

Embodiments of an article transport facility as well as a route setting method and a route setting program for route setting in the article transport facility will be described below with reference to the drawings. As shown in FIG. 1, the article transport facility includes article transport vehicles 3 that travel along a specified travelable route 1 and transport articles W, and a controller H that controls the article transport vehicles 3 (see FIG. 5). In the present embodiment, traveling rails 2 (see FIGS. 2 and 3) are disposed along the specified travelable route 1, a plurality of article transport vehicles 3 are provided, and the article transport vehicles 3 travel in one direction along the travelable route 1 on the traveling rails 2. As shown in FIG. 4, the traveling rails 2 are each constituted by a pair of left and right rail portions 2A. Note that in the present embodiment, the article transport vehicles 3 each transport an FOUP (Front Opening Unified Pod) that houses a semiconductor substrate serving as the article W.

As shown in FIG. 1, the travelable route 1 includes two main routes 4 and a plurality of sub-routes 5 that pass by a plurality of article processing apparatuses P. The two main routes 4 and the sub-routes 5 are each shaped as a loop. The two main routes 4 are provided in a concentric loop state. These two loop-shaped main routes 4 are routes on which the article transport vehicles 3 travel in the same direction (counterclockwise). In FIG. 1, the traveling directions of the article transport vehicles 3 are indicated by arrows.

Out of the two main routes 4, the inner main route 4 will be referred to as a first main route 4A, and the outer main route 4 will be referred to as a second main route 4B. The first main route 4A is set to pass by a plurality of storage units R. The first main route 4A is used as an article transfer route for stopping an article transport vehicle 3 in order to transfer an article W to or from a storage unit R. On the other hand, the second main route 4B is used as a continuous traveling route for allowing the article transport vehicles 3 to travel continuously.

The travelable route 1 includes shortcut routes 6, branch routes 7, merge routes 8, and transit routes 9. The shortcut routes 6 are each connected to each of a pair of parallel straight portions of the first main route 4A. The shortcut route 6 is a route for allowing an article transport vehicle 3 to travel from a first one of the pair of straight portions of the first main route 4A to the second straight portion, or from the second one to the first one. The branch routes 7 are each connected to the second main route 4B and a sub-route 5, and are routes for allowing the article transport vehicles 3 to travel from the second main route 4B to the sub-routes 5. The merge routes 8 are each connected to a sub-route 5 and the second main route 4B, and are routes for allowing the article transport vehicles 3 to travel from the sub-routes 5 to the second main route 4B. The transit routes 9 are each connected to the first main route 4A and the second main route 4B, and are routes for allowing the article transport vehicles 3 to travel from the first main route 4A to the second main route 4B or from the second main route 4B to the first main route 4A.

Figure 2:
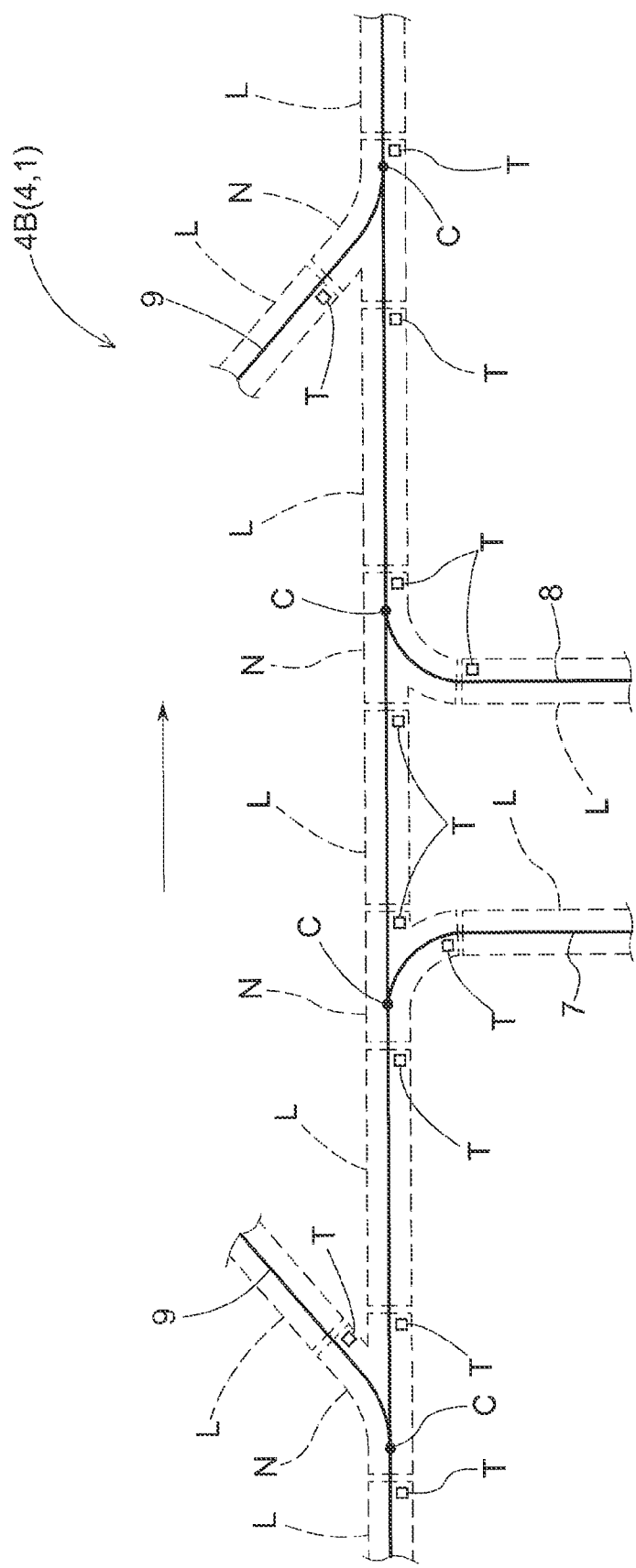
FIG. 2 shows nodes and links of a travelable route.

As shown in FIG. 2, the travelable route 1 includes a plurality of nodes N at which a route branches or routes merge, and a plurality of links L, which are each a route portion that connects a pair of nodes N. In the present embodiment, a node N is a route portion corresponding to a specified range extending upstream and downstream from a connection point C where a route branches or two routes merge.

In the example of the portion of the second main route 4B shown in FIG. 2, in the case where the connection point C is the point where a transit route 9 branches from or merges with the second main route 4B, the node N corresponds to a specified range extending from the connection point C in the second main route 4B and the transit route 9. Also, in the case where the connection point C is the point where a branch route 7 branches from the second main route 4B, the node N corresponds to a specified range extending from the connection point C in the second main route 4B and the branch route 7. Also, in the case where the connection point C is the point where a merge route 8 merges with the second main route 4B, the node N corresponds to a specified range extending from the connection point C in the second main route 4B and the merge route 8. The link L is a route portion that is between a pair of nodes N in the second main route 4B and is connected to the pair of nodes N. In the present embodiment, the specified range extending from the connection point C is set based on the positions of a plurality of detection objects T disposed along the travelable route 1, as will be described later. In other words, the detection objects T are each disposed at a position corresponding to the boundary between a node N and a link L.

Figure 3:
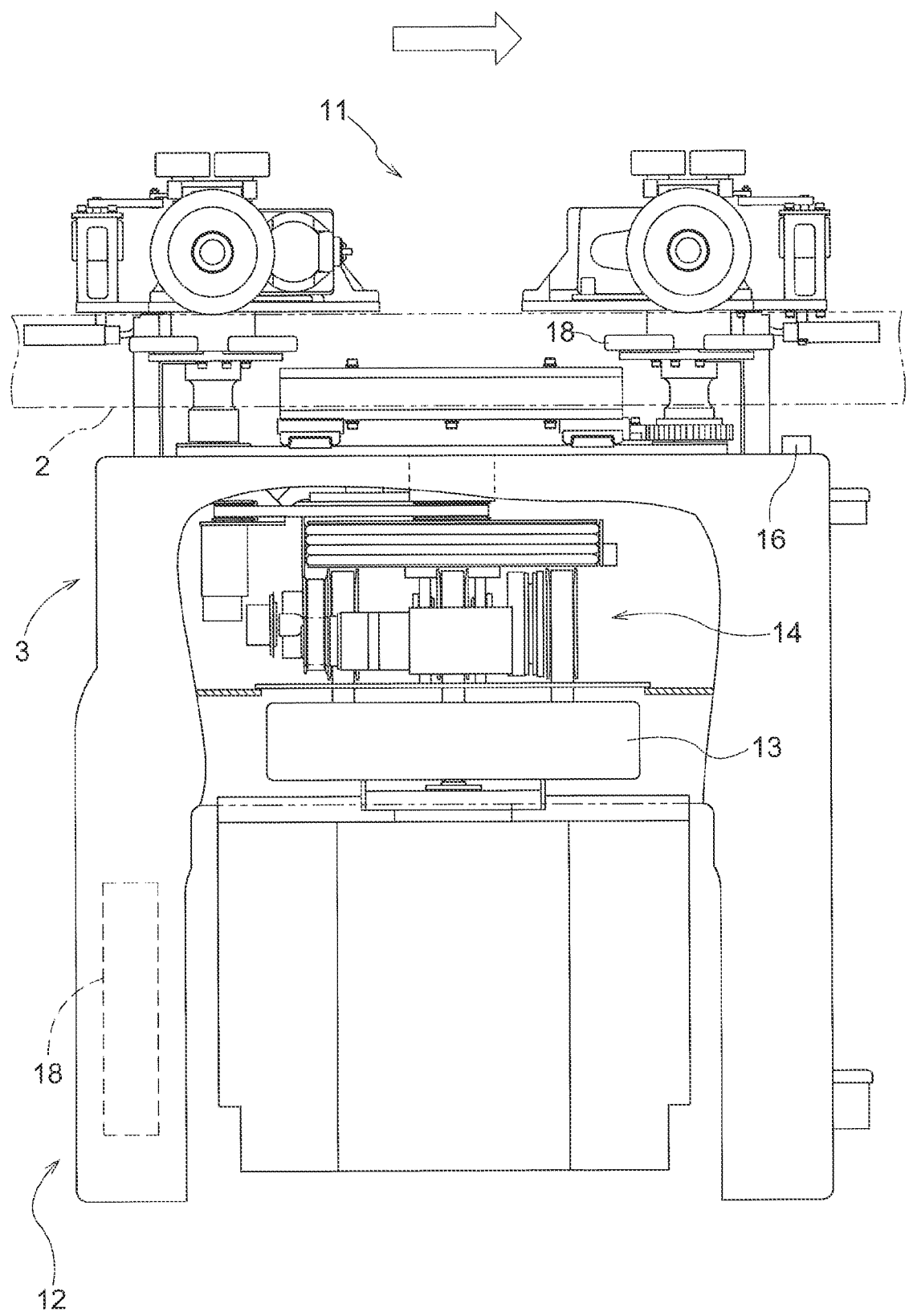
FIG. 3 is a side view of an article transport vehicle.
Figure 4:
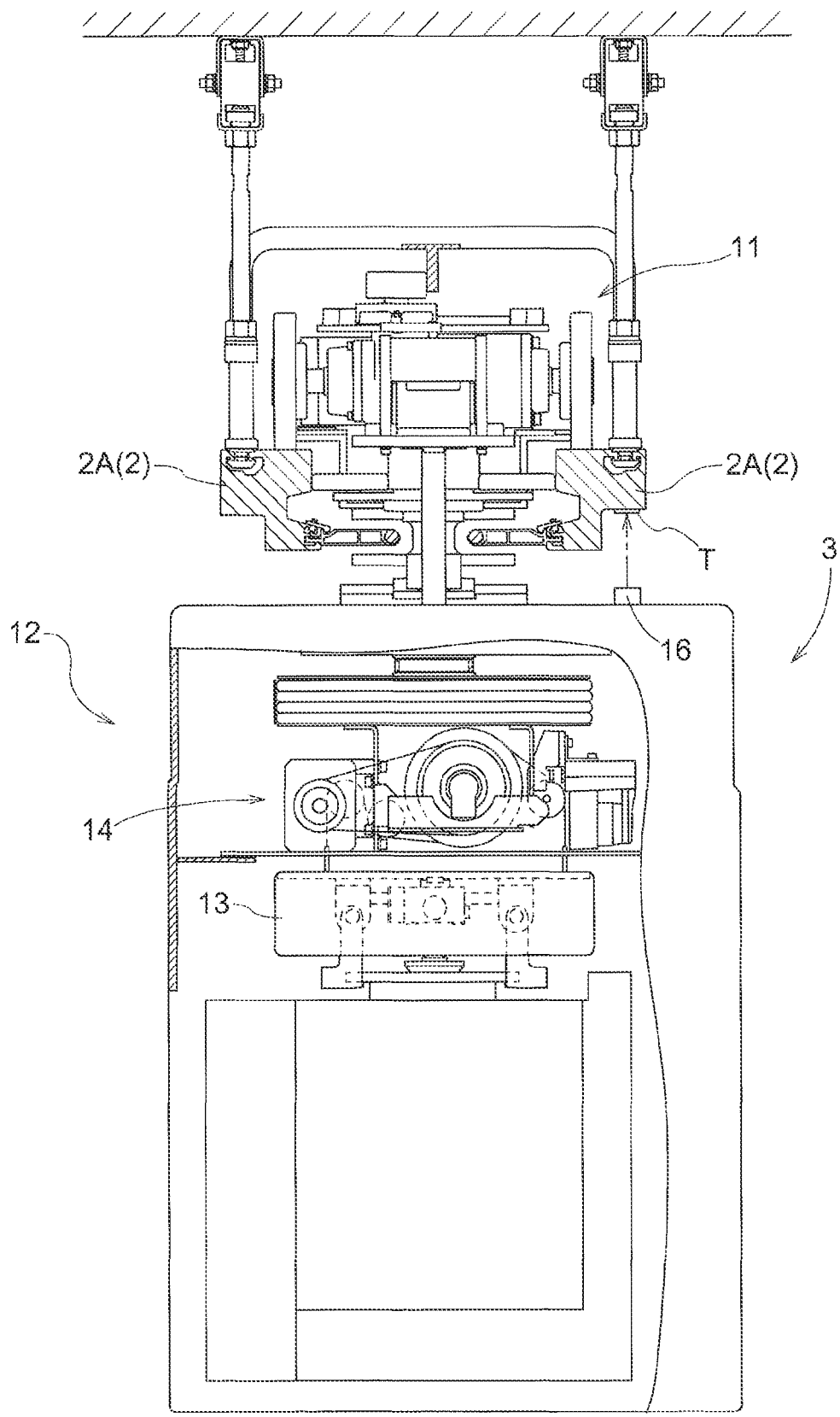
FIG. 4 is a front view of the article transport vehicle.

As shown in FIGS. 3 and 4, the article transport vehicle 3 includes a traveling portion 11 that travels along a traveling rail 2, which is suspended from and supported by the ceiling, at a position above the traveling rail 2, and a main body portion 12 that is located below the traveling rail 2 and is suspended from and supported by the traveling portion 11. The main body portion 12 includes a support mechanism 13 that supports an article W in a suspended state, and an elevating mechanism 14 that moves the support mechanism 13 in the vertical direction relative to the main body portion 12. In the case where an article processing apparatus P or a storage unit R is a transport-source transfer target location 15 (see FIG. 1), the article transport vehicle 3 travels to a position corresponding to the transport-source transfer target location 15, retrieves an article W at the transport-source transfer target location 15, and transfers the article W from that transfer target location 15 to the interior of the main body portion 12. Thereafter, the article transport vehicle 3 travels to a position corresponding to a transport-destination transfer target location 15, and transfers the article W supported by the support mechanism 13 from the interior of the main body portion 12 to the transport-destination transfer target location 15. As a result, the article W is transported from the transport-source transfer target location 15 to the transport-destination transfer target location 15. At this time, in the present embodiment, the article transport vehicle 3 travels at a first speed when traveling on a straight route, and travels at a second speed, which is lower than the first speed, when traveling on a curved route.

Figure 5:
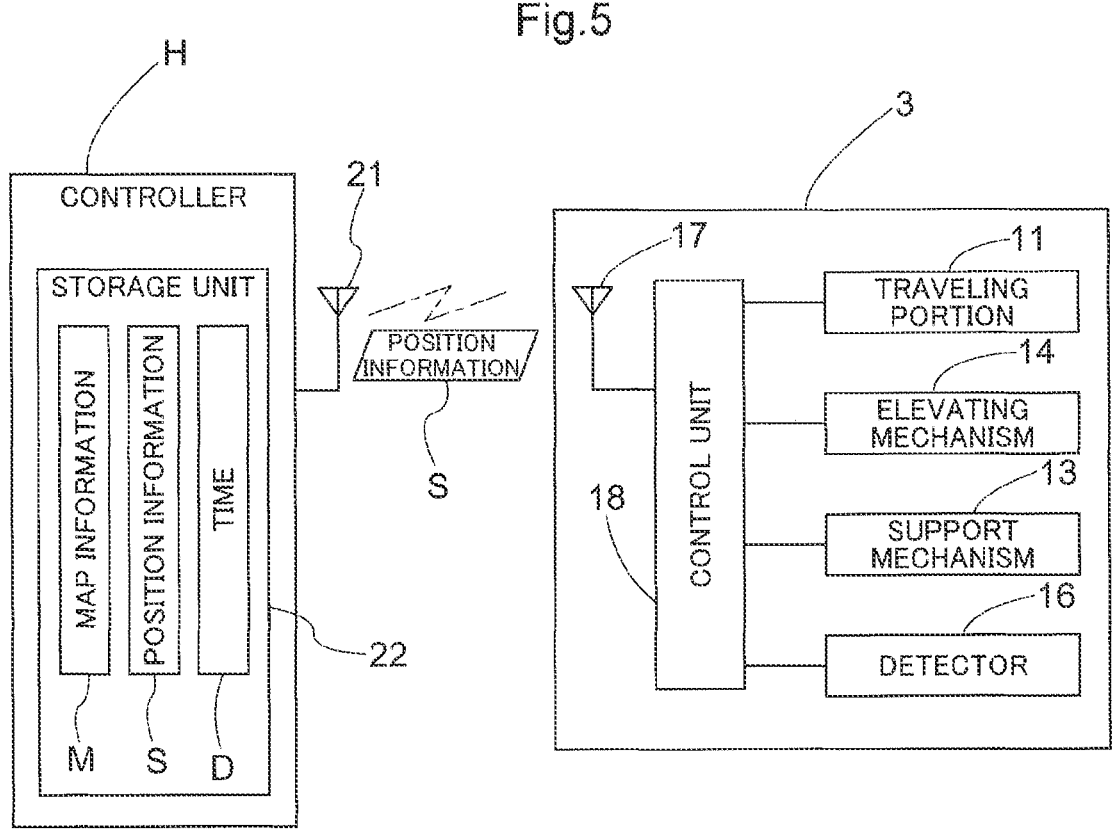
FIG. 5 is a control block diagram.

As shown in FIG. 5, the article transport vehicle 3 includes a detector 16, a transmission/reception device 17, and a control unit 18. The detector 16 detects detection objects T (see FIGS. 2 and 4) that are disposed along the travelable route 1. Each detection object T has position information indicating the position where the detection object T is disposed, and the detector 16 reads the position information of the detection object T. A plurality of detection objects T are disposed along the travelable route 1, and more specifically are disposed at connection points between nodes N and links L, positions corresponding to the transfer target locations 15, and the like. The transmission/reception device 17 reads the position information of a detection object T detected by the detector 16, and transmits the read position information S to a transmission/reception unit 21 of the controller H as necessary. Specifically, the article transport vehicle 3 transmits position information S to the controller H when entering a link L, exiting a link L, and reaching a position corresponding to a transfer target location 15. The position information S transmitted by the article transport vehicle 3 to the controller H corresponds to position information S that indicates the position of that article transport vehicle 3. Also, the article transport vehicles 3 each transmit position information S indicating their position to the controller H. The transmission/reception device 17 also receives information transmitted by the transmission/reception unit 21 of the controller H.

The controller H includes a storage unit 22 that stores map information M regarding the travelable route 1, which is information regarding the links L and the nodes N that make up the travelable route 1 as described above. The storage unit 22 also stores the position information S received from the article transport vehicles 3 in association with a corresponding time D. In the present embodiment, the controller H stores the time D when position information S is received from the transmission/reception device 17 of an article transport vehicle 3, in association with the position information S. Note that if the article transport vehicles 3 are configured to transmit time information that indicates the time D when the position information S of the detection object T was read, to the controller H together with the position information S, the controller H may store the time D shown in that time information in the storage unit 22 in association with the position information S. The controller H acquires number of vehicles information based on the positions of the article transport vehicles 3 at respective time points, which are obtained based on the information stored in the storage unit 22. The controller H can acquire the position of each of the article transport vehicles 3 on the travelable route 1 based on the position information S received from the article transport vehicles 3.

For example, in the time period from reception of position information S that is transmitted when an article transport vehicle 3 enters a link L (or exits the node N upstream of that link L) until reception of position information S that is transmitted when the article transport vehicle 3 exits that link L, the controller H can determine that the article transport vehicle 3 is present in the link L whose entrance corresponds to the received position information S. Also, in the case where a transfer target location 15 is located in a link L, if position information S transmitted upon arrival at the transfer target location 15 has not been received from an article transport vehicle 3 determined to be present in the link L, it can be determined that the article transport vehicle 3 is located upstream of the transfer target location 15 in the link L, and if the position information S has been received, it can be determined that the article transport vehicle 3 is located at the transfer target location 15 or downstream thereof in the link L. In this way, the controller H acquires the number of article transport vehicles 3 located in each of the links L based on the positions of the plurality of article transport vehicles 3 at respective time points. At this time, in the case of a link L that includes a transfer target location 15, the controller H acquires the number of article transport vehicles 3 located upstream of the transfer target location 15 in the link L and the number of article transport vehicles 3 located downstream of the transfer target location 15 in the link L.

As described above, the controller H stores the map information M in the storage unit 22. The map information M includes basic map information, which includes information indicating the positions and connection relationships of the links L and the nodes N along the travelable route 1, attribute information indicating attributes of the links L and the nodes N, and information indicating the shapes of the links L and the shapes of the nodes N. The map information also includes travel control information in which various types of information necessary for traveling of the article transport vehicles 3, such as position information S for a plurality of points on the travelable route 1, is associated with the basic map information.

Figure 6:
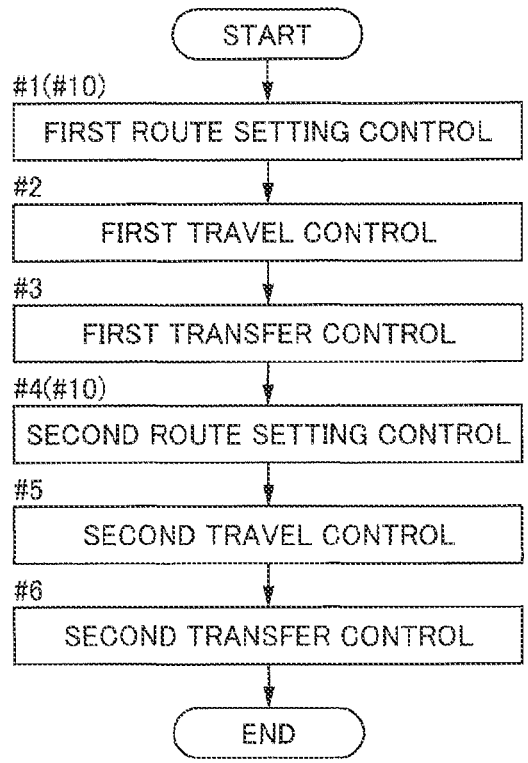
FIG. 6 is a flowchart of transport control.

In the case of transporting an article W from a transport source to a transport destination, as shown in the flowchart of transport control in FIG. 6, the controller H sequentially executes: first route setting control #1 for setting a first set route for causing an article transport vehicle 3 to travel from a current position to a position (destination) corresponding to a transport-source transfer target location 15 based on the basic map information; first travel control #2 for causing the article transport vehicle 3 to travel along the first set route and reach a position corresponding to the transport-source transfer target location 15; first transfer control #3 for transferring the article W at the transport-source transfer target location 15 to the main body portion 12; second route setting control #4 for setting a second set route for causing the article transport vehicle 3 to travel from the current position to a position (destination) corresponding to a transport-destination transfer target location 15 based on the basic map information; second travel control #5 for causing the article transport vehicle 3 to travel along the second set route and reach a position corresponding to the transport-destination transfer target location 15; and second transfer control #6 for transferring the article W in the main body portion 12 to the transport-destination transfer target location 15.

The first route setting control #1 and the second route setting control #4 are similar types of control, and will be simply referred to as route setting control #10 when there is no need to distinguish between them. In other words, the route setting control #10 includes the first route setting control #1 and the second route setting control #4. Therefore, a set route 1A includes the first set route and the second set route described above.

Figure 8:
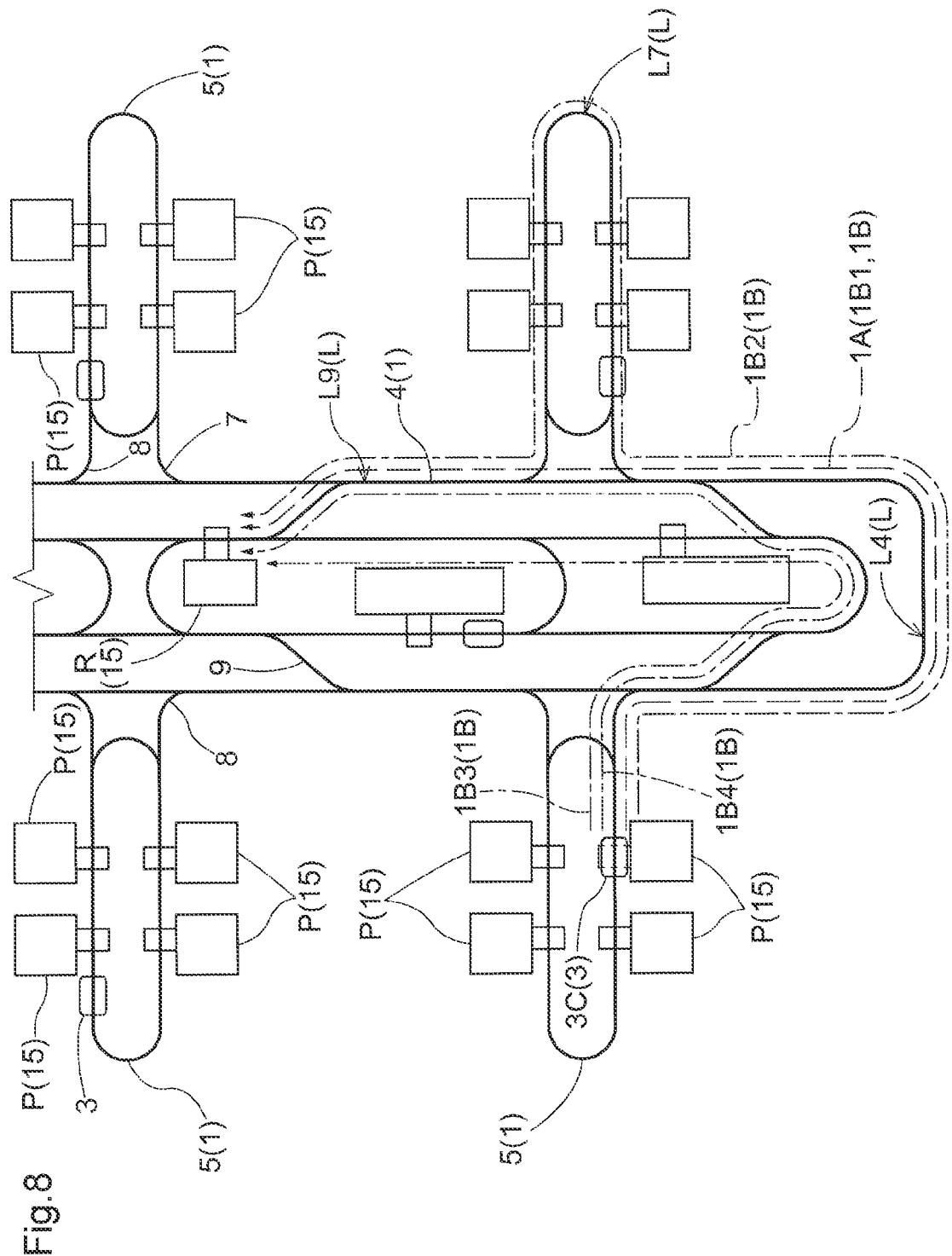
FIG. 8 is a diagram showing an example of a set route and candidate routes for an article transport vehicle.

As shown in FIG. 8, there can be multiple routes from the current position to a destination. In other words, there are a plurality of candidate routes 1B that are candidates for the set route 1A. FIG. 8 illustrates four candidate routes 1B, namely a first candidate route 1B1, a second candidate route 1B2, a third candidate route 1B3, and a fourth candidate route 1B4. If a plurality of candidate routes 1B exist, the controller H determines one set route 1A from among the candidate routes 1B. In the example shown in FIG. 8, the first candidate route 1B1 has been set as the set route 1A.

The controller H executes the route setting control #10 for setting the set route 1A (e.g., the first candidate route 1B1 indicated by dashed lines in FIG. 8) for causing the article transport vehicle 3 to travel from the current position to a destination on the travelable route 1, based on link costs LC set for the links L. The link costs LC each include a reference cost ST, which is a static (fixed) cost, and a variable cost DY, which is a dynamic cost, and the link cost LC is calculated using the following expression (1). The link cost LC will be described later.

$$LC = ST + DY \quad (1)$$

Figure 7:
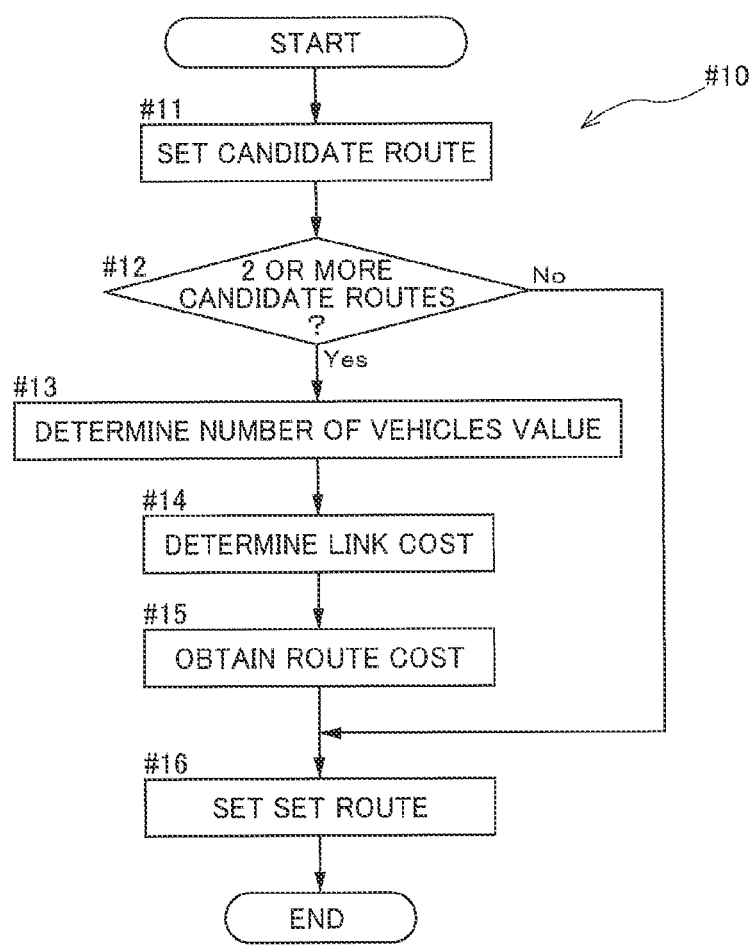
FIG. 7 is a flowchart of route setting control.

In the present embodiment, as shown in the flowchart of the route setting control #10 in FIG. 7, based on current position information of a setting vehicle 3C, destination information, and the map information, the controller H sets one or more candidate routes 1B as routes that enable traveling from the current position to the destination (#11). Next, the controller H determines whether or not two or more set candidate routes 1B were set (#12). If only one candidate route 1B was set, the controller H sets the candidate route 1B as the set route 1A (#15). If two or more candidate routes 1B were set, the controller H first determines a number of vehicles value n for each of all of the links L that belong to the candidate routes 1B (#13). The method for determining the number of vehicles value n will be described later. Next, the controller H determines the link cost LC for each of all of the links L that belong to the candidate routes 1B based on the reference cost ST and the variable cost DY that corresponds to the number of vehicles value n (#14). Then, for each of the candidate routes 1B, the controller H obtains a route cost TC, which is the total cost of the candidate route 1B, based on the link costs LC of the links L that belong to the candidate route 1B (#15), and sets one set route 1A from among the two or more candidate routes 1B based on the route costs TC of the candidate routes 1B (#16).

The controller H repeatedly executes the route setting control #10 at least at a regular time interval. As the setting vehicle 3C approaches a target link LA, the actual influence of other vehicles 3B approaches the actual state. For this reason, if the route setting control #10 is repeatedly executed at a regular time interval, the route setting can be reviewed while the setting vehicle 3C is moving, and the route setting can be performed more precisely based on the influence of other vehicles 3B.

The following describes the link cost LC and the number of vehicles value n. Here, the setting vehicle 3C is defined as the article transport vehicle 3 for which the set route 1A is to be set in the route setting control #10. Also, the target vehicle 3A is defined as an article transport vehicle 3 that passes through a link L on the candidate route 1B of the setting vehicle 3C, and the target link LA is defined as the link L through which the target vehicle 3A passes. Also, the other vehicle 3B is defined as an article transport vehicle 3 other than the target vehicle 3A.

Figure 9:
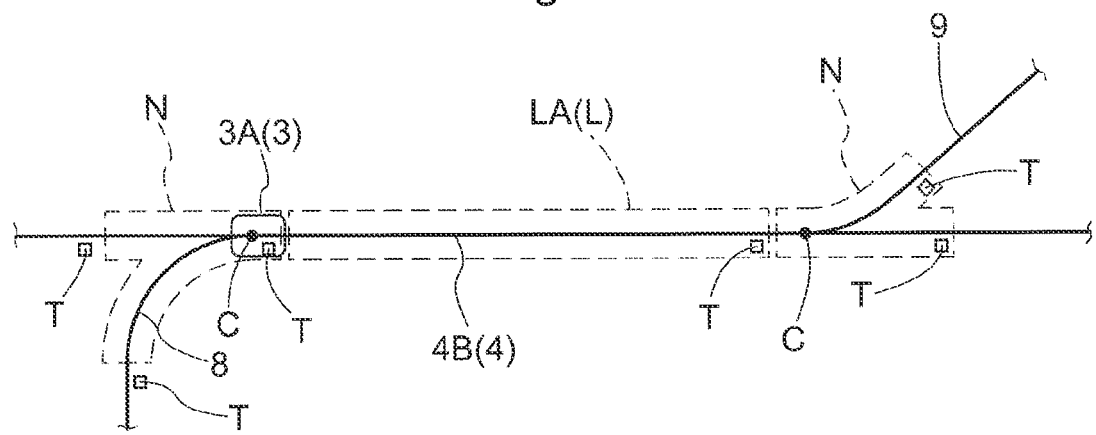
FIG. 9 is a diagram showing a state in which a target vehicle enters a target link in an empty traveling state.
Figure 10:
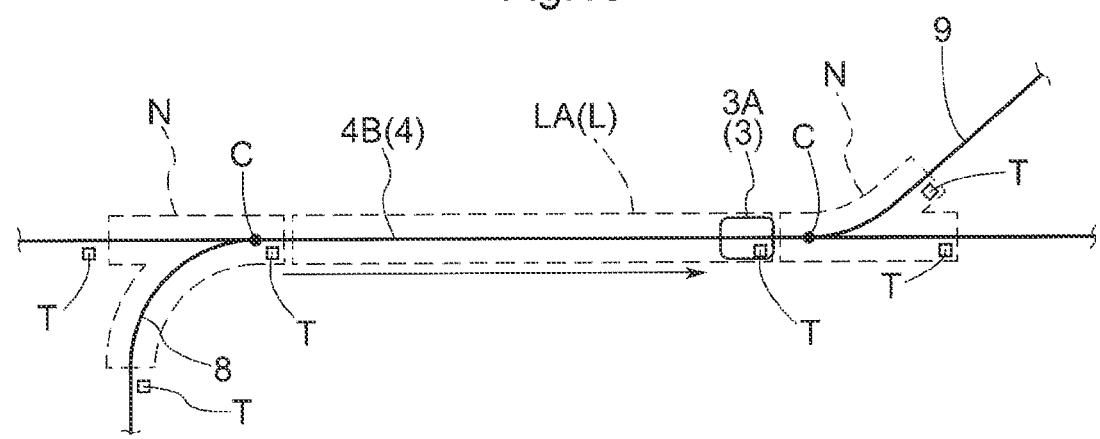
FIG. 10 is a diagram showing a state in which a target vehicle exits from a target link in an empty traveling state.

The reference cost ST for each link L is a value set based on a reference transit time, which is the time required for the target vehicle 3A to pass through the target link LA when another vehicle 3B is not present in the target link LA. In the present embodiment, as shown in FIG. 9, upon receiving position information S transmitted by a target vehicle 3A entering a target link LA in an empty traveling state in which no other vehicle 3B is present in the target link LA, the controller H calculates the reference transit time based on the time D of reception of position information S transmitted by the target vehicle 3A entering the target link LA and the time D of reception of position information S transmitted by the target vehicle 3A exiting the target link LA as shown in FIG. 10. The controller H sets the reference cost ST based on this reference transit time. For example, the reference cost ST can be the number of seconds making up the reference transit time.

Here, in order to improve the accuracy as an index of the reference cost ST, the controller H causes the target vehicle 3A to travel through the target link LA a plurality of times in a state where no other vehicle 3B is present in the target link LA, acquires the reference transit time for each of the times, and sets the reference cost ST based on the acquired reference transit times. In the present embodiment, the reference cost ST is the average value of the reference transit times of the trips, and the controller H sets the reference cost ST by dividing the total of the reference transit times by the number of trips. For example, if the reference cost ST is set based on two trips, and the reference transit time is 5 seconds and 8 seconds, then the total of 5 seconds and 8 seconds (13 seconds) is divided by the number of trips (2), thus obtaining the reference cost ST of 6.5. In the present embodiment, the target vehicle 3A is caused to travel the entire travelable route 1 a plurality of times before starting the operation of transporting articles W in the article transport facility, and the reference cost ST is set in advance for all of the links L that belong to the travelable route 1. In other words, before the controller H executes the route setting control #10 for the first time (here, before the operation of the article transport facility 100 starts), the reference cost ST is set for each of all of the links L that belong to the travelable route 1.

Also, the node cost is set for all of the nodes N that belong to the travelable route 1 before the route setting control #10 is executed (in the present embodiment, before the operation of the article transport facility 100 is started). This node cost is a cost set for each of the nodes N. In the present embodiment, the controller H performs control such that only one article transport vehicle 3 can enter a node N section, and thus the transit time for the article transport vehicle 3 to pass through a node N section is substantially fixed. In view of this, in this example, the node cost is set to a fixed value that does not have a variable component. Here, the node cost is set to a value that corresponds to the shape of the node N. Note that the present invention is not limited to this, and it is also favorable if, similarly to the reference cost ST described above, the node cost is a value set based on the reference transit time, which is the time required for the target vehicle 3A to pass the target node N while no other vehicle 3B is present. Alternatively, the node cost may be a uniform value for all nodes N regardless of their shape or the like.

As described above, due to the node cost being a fixed value, it is a value uniquely determined according to the number of nodes N in the candidate route 1B. In other words, it is not a value that changes according to the transport state of the article transport vehicle 3. Accordingly, the node cost may be added to the reference cost ST for the link L described above to obtain the reference cost ST.

The variable cost DY is a value that corresponds to the transit time (actual transit time) in an actual traveling state in which the target vehicle 3A travels through the target link LA while another vehicle 3B is present in the target link LA, and is a value that changes according to the number of other vehicles 3B. The larger the number of other vehicles 3B present in the target link LA is, the longer the actual transit time is. Here, this transit time, which increases each time the number of other vehicles 3B present in the target link LA increases, will be referred to as the "time increase per vehicle ΔTn". The variable cost DY is a value set based on the amount of time that the actual transit time, which is the time required for the target vehicle 3A to travel through the target link LA in the actual traveling state in which the target vehicle 3A travels through the target link LA while another vehicle 3B is present in the target link LA, increases relative to the reference transit time in accordance with the number of other vehicles 3B present in the target link LA (time increase per vehicle ΔTn (amount of increase in actual transit time)). Due to being the amount of increase in the actual transit time that increases each time the number of other vehicles 3B increases, the time increase per vehicle ΔTn corresponds to a "reference other vehicle cost".

Here, in order to improve the accuracy as an index of the variable cost DY, the controller H causes the target vehicle 3A to travel through the target link LA a plurality of times in a state where another vehicle 3B is present in the target link LA, acquires the actual transit time and the number of vehicles information indicating the number of other vehicles 3B present in the target link LA for each of the times, and obtains the time increase per vehicle ΔTn based on the correlation between the number of vehicles information and the amount of increase in the actual transit time relative to the actual transit time. Specifically, the controller H sets, as the time increase per vehicle ΔTn, the amount of increase in the actual transit time per other vehicle, which is obtained by dividing the amount of increase in the actual transit time relative to the reference transit time by the number of vehicles indicated by the number of vehicles information. The average value of the time increase per vehicles ΔTn obtained by causing the target vehicle 3A to travel through the target link LA a plurality of times is set as the final time increase per vehicle ΔTn.

Figure 11:
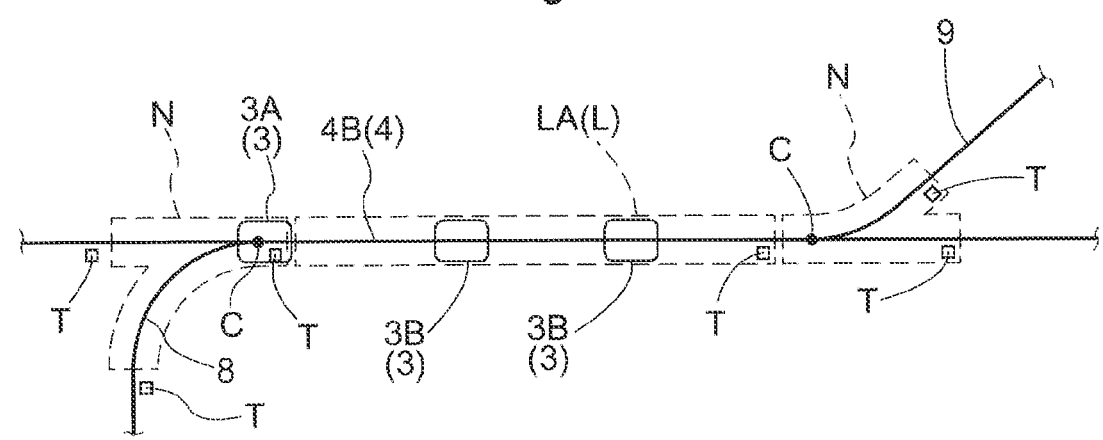
FIG. 11 is a diagram showing a state in which a target vehicle enters a target link in an actual running state.
Figure 12:
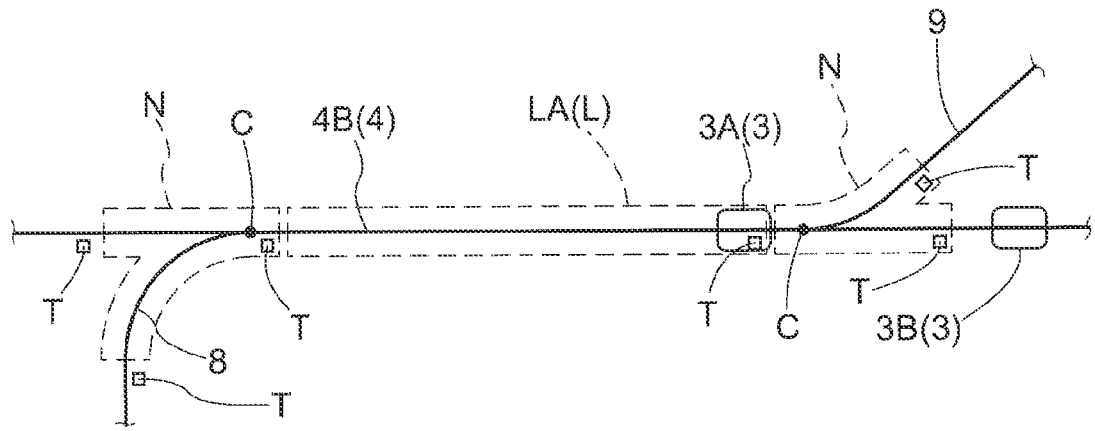
FIG. 12 is a diagram showing a state in which a target vehicle exits from a target link in an actual running state.

In the present embodiment, as shown in FIG. 11, upon receiving position information S transmitted by a target vehicle 3A entering a target link LA in an actual traveling state in which another vehicle 3B is present in the target link LA, the controller H calculates the actual transit time based on the time D of reception of position information S transmitted by the target vehicle 3A entering the target link LA and the time D of reception of position information S transmitted by the target vehicle 3A exiting the target link LA as shown in FIG. 12. The controller H obtains the time increase per vehicle ΔTn (e.g., 5 seconds) by dividing the amount of increase (e.g., 10 seconds) in the actual transit time (e.g., 15 seconds) relative to the reference transit time (e.g., 5 seconds) by the number of vehicles (2 vehicles in FIG. 11) indicated by the number of vehicles information.

In the present embodiment, the calculation of the time increase per vehicle ΔTn is performed both before the start of operation, which is before the start of transportation of the article W in the article transport facility 100, and after the start of operation. Specifically, the controller H first causes a plurality of article transport vehicles 3, which are the target vehicle 3A and the other vehicle 3B, to travel over the entire travelable route 1 before the start of operation in order to obtain the time increase per vehicle ΔTn for all of the links L that belong to the travelable route 1. In other words, the controller H sets the initial time increase per vehicle ΔTn for all of the links L that belong to the travelable route 1 before executing initial first route setting control (here, before the start of operation).

Further, even after the start of operation, which is after the start of transportation of the article W in the article transport facility, the controller H obtains the time increase per vehicle ΔTn for the links L that belong to the travelable route 1 for the target vehicle 3A and the other vehicle 3B, which are the plurality of article transport vehicles 3 traveling on the travelable route 1, and accordingly updates the time increase per vehicles ΔTn as necessary. At this time, the controller H obtains the time increase per vehicle ΔTn each time the target vehicle 3A passes through the target link LA, and therefore updates the time increase per vehicle ΔTn based on the obtained time increase per vehicle ΔTn and time increase per vehicles ΔTn obtained in the past. It is preferable that such updating of the time increase per vehicle ΔTn is performed regularly during the operation of the article transport facility. It is also preferable that the variable cost DY used for the route setting control is set based on the most recent time increase per vehicle ΔTn.

However, in the present embodiment, when setting the time increase per vehicle ΔTn (reference other vehicle cost), the controller H excludes the number of vehicles information and the actual transit time for when a problem occurred in the traveling of the target vehicle 3A, and the number of vehicles information and the actual transit time for when the target vehicle 3A passes through the target link LA while traveling is limited by the occurrence of a problem. If the passage of the target vehicle 3A through the target link LA is obstructed due to an abnormal stop of another vehicle 3B, an obstacle present during passage through the target link LA, or the like, or if an abnormality occurs in the target vehicle 3A and the target vehicle 3A stops or decelerates, the actual transit time for the target vehicle 3A to pass through the target link LA becomes significantly longer. In other words, if the number of vehicles information and the actual transit time obtained during such traveling are used for setting the time increase per vehicle ΔTn (reference other vehicle cost), the reference other vehicle cost is set to a value larger than what the value actually is. By excluding the number of vehicles information and the actual transit time obtained during such traveling when setting the reference other vehicle cost, it is possible to set a more appropriate reference other vehicle cost.

In the route setting control, the controller H determines the number of vehicles value n, which is the number of other vehicles 3B considered to be present in the target link LA, and sets the variable cost DY for the target link LA according to the number of vehicles value n. The controller H can set the variable cost DY to a value obtained by multiplying the number of vehicles value n for the target link LA by the time increase per vehicle ΔTn (amount of increase in actual transit time per other vehicle) for the target link LA obtained as described above. In other words, the variable cost DY can be set to the number of seconds obtained by multiplying the time increase per vehicle ΔTn by the number of vehicles value n, as shown in the following expression (2).

$$DY = \Delta Tn \cdot n \tag{2}$$

For example, if the number of vehicles value n of the target link LA is 4 and the time increase per vehicle ΔTn is 5 seconds, 20 is set as the variable cost DY (reference variable cost DYr). In this way, the variable cost DY is an index showing the amount of increase in the actual transit time of the target link LA, which is expected to increase as the number of other vehicles 3B considered to be present in the target link LA increases. When executing the route setting control, the controller H sets the variable cost DY for all of the links L belonging to the candidate route 1B that are candidates for the set route 1A from the current position of the setting vehicle 3C to the destination.

Based on the variable cost DY and the reference cost ST set in this way, the controller H determines the link cost LC for each of the links L in the candidate route 1B, which is a candidate for the set route 1A from the current position of the setting vehicle 3C to the destination. The route cost TC, which is the total cost of the candidate route 1B, is obtained based on the link costs LC, and the set route 1A is set based on the route costs TC of the candidate route 1B.

The following describes a method for determining the number of vehicles value n. When the controller H determines the number of vehicles value n, other vehicles 3B determined to actually be present in the target link LA are deemed to be other vehicles that are present in the target link LA. The number of such other vehicles 3B is the current number of vehicles value na. Also, in the present embodiment, when the controller H determines the number of vehicles value n, another vehicle 3B for which the set route 1A passing through the target link LA has already been set is deemed to be another vehicle present in the target link LA regardless of the current position of the other vehicle 3B. Note that another vehicle 3B for which the set route 1A passing through the target link LA has already been set may also be another vehicle 3B for which the set route 1A having the target link LA as the destination has already been set. This number of other vehicles 3B is a future number of vehicles value nb. In other words, the number of vehicles value n is the sum of the current number of vehicles value na and the future number of vehicles value nb as shown in the following expression (3).

$$n = na + nb \quad (3)$$

Figure 13:
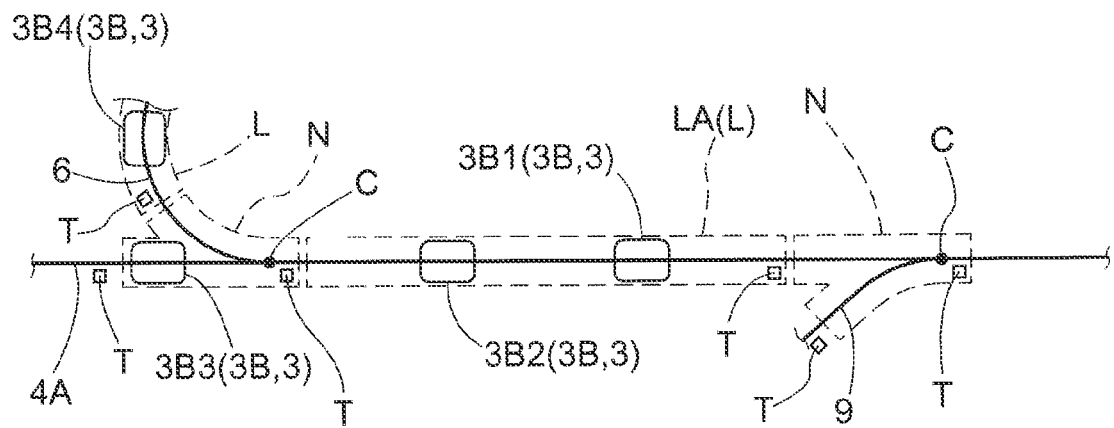
FIG. 13 is a diagram showing other vehicles considered to be present in the target link.

In other words, in the present embodiment, when the controller H determines the number of vehicles value n (4 in the example in FIG. 13), the other vehicles deemed to be present in the target link LA are the other vehicles 3B determined to be present in the target link LA when executing the route setting control #10 for the setting vehicle 3C (2 vehicles in the example shown in FIG. 13), as well as the other vehicles 3B that were determined to not be present in the target link LA when executing the route setting control #10 but are other vehicles 3B for which the target link LA has already been entirely or partially set as the set route 1A (two vehicles in the example shown in FIG. 13). In this way, the links L that belong to the candidate routes 1B are used as the target links LA, and the controller H determines the number of vehicles value n for each of target links LA.

By determining the number of vehicles value n in this way, the link cost LC of the target link LA can be determined based on not only the actual congestion level of the target link LA when route setting control is performed for the setting vehicle 3C (in the example shown in FIG. 13, there are two other vehicles 3B), but also the future congestion level of the target link LA. Specifically, even if another vehicle 3B is not present in the target link LA at the time of route setting control, if it is scheduled to pass through the target link LA, that other vehicle 3B can possibly be present in the target link LA before or after the setting vehicle 3C passes through the target link LA, and thus may increase the congestion level of the target link LA. Also, if there are many other vehicles 3B that are not present in the target link LA before or after the setting vehicle 3C passes through the target link LA but are scheduled to pass through the target link LA, the future congestion level of the target link LA is likely to be high. According to the configuration of the present embodiment, the link cost LC of the target link LA can be determined based on the future congestion level of the target link LA as well, and thus the set route 1A of the setting vehicle 3C is more likely to be set appropriately.

The controller H determines the link cost LC for each of the target links LA that make up the candidate route 1B. As shown in the following expression (4), the link cost LC is determined based on the reference cost ST and the variable cost DY that corresponds to the number of vehicles value n.

$$LC = ST + DY = ST + (\Delta Tn \cdot n) = ST + (\Delta Tn \cdot (na + nb)) \quad (4)$$

The reference cost ST is a value set based on the reference transit time, and is the number of seconds in the reference transit time in the present embodiment. Accordingly, for example, if the reference transit time is 10 seconds, the reference cost ST is set to "10". Also, the variable cost DY is a value set based on the time increase per vehicle $\Delta Tn$ of vehicles, and in the present embodiment, is the number of seconds set based on the value obtained by multiplying the number of vehicles value n by the time increase per vehicle $\Delta Tn$, which indicates the time increase per other vehicle. Therefore, for example, if the number of vehicles value n is 4 and the time increase per vehicle $\Delta Tn$ is 5 seconds, the variable cost DY is set to "20". If the reference cost ST and the variable cost DY are set as in these examples, the link cost LC of the target link LA is the sum of the reference cost ST "10" and the variable cost DY "20", or in other words is "30". The controller H determines the link cost LC for each of the target links LA that make up the candidate route 1B.

Note that because the number of vehicles value n includes the current number of vehicles value na and the future number of vehicles value nb, the variable cost DY can also be expressed by expanding the second term on the right side of expression (4) as shown in the following expression (5). In order to distinguish between the variable cost DY that is based on the current number of vehicles value na (the first term on the right side) and the variable cost DY that is based on the future number of vehicles value nb (the second term on the right side), the former will be called the first variable cost DYa and the latter will be called the second variable cost DYb. In this case, the link cost LC shown in expression (4) is expressed by the following expression (6).

$$DY = \Delta Tn \cdot na + \Delta Tn \cdot nb = DYa + DYb \quad (5)$$

$$LC = ST + DY = ST + DYa + DYb \quad (6)$$

Note that the above expressions (2) to (6) show calculation in the case where the influences of the other vehicles 3B are equal to each other. In other words, they illustrate aspects in which the time increase per vehicles $\Delta Tn$ of the other vehicles 3B are added up with the same weighting. However, the number of vehicles value n includes the current number of vehicles value na and the future number of vehicles value nb, and the future number of vehicles value nb may include other vehicles 3B that will not actually pass through the target link LA, and thus may be different from the actual value. Therefore, the weighting may be set differently for each of the other vehicles 3B counted in the future number of vehicles value nb in particular. In other words, the current number of vehicles value na indicates the number of other vehicles 3B present in the target link LA at the current time (at the set time for executing the route setting control #10), and therefore the weighting may be the same for each of the other vehicles 3B. However, because the future number of vehicles value nb includes other vehicles that may not be present in the target link LA at the current time, the weighting may be set differently for each of the other vehicles 3B according to the likelihood of being present, for example. When such weighting is taken into consideration, the link cost LC shown in expression (5) can be expressed as in the following expression (7).

$$DY = DYa + DYb = \Delta Tn \cdot na + \sum_{i=1}^{nb} \Delta Tn \cdot Vi \qquad (7)$$

Here, "Vi" is a value indicating the weighting of the article transport vehicle 3 (i.e., a separation adjustment value, which will be described in detail later with reference to FIG. 15), and the separation adjustment value Vi is a value greater than 0 and less than or equal to 1. Note that in expression (7), if all Vi values are "1", the value of the variable cost DY is the same as the expressions (2) and (5). Also, in the above description, the time increase per vehicle $\Delta Tn$ corresponds to the "reference other vehicle cost". Here, the element "$\Delta Tn$ Vi" constituting the second variable cost DYb in expression (7) correspond to the "adjusted other vehicle cost", which is obtained by adjusting the reference other vehicle cost (time increase per vehicle $\Delta Tn$) by the separation adjustment value Vi.

In the above description, if the number of vehicles value n is "4" and the time increase per vehicle $\Delta Tn$ is 5 seconds, the variable cost DY is "20" based on expression (2). Here, assuming that the breakdown of "number of vehicles value n=4" is "current number of vehicles value na=2" and "future number of vehicles value nb=2", the two other vehicles 3B counted in the future number of vehicles value nb respectively have separation adjustment values Vi of "V1=0.5" and "V2=1". In this case, based on expression (7), the variable cost DY is calculated as "17.5" as shown in expression (8) below.

$$DY = \Delta Tn \cdot na + (\Delta Tn \cdot V1 + \Delta Tn \cdot V2) = 17.5 \qquad (8)$$

Also, in the present embodiment, the controller H corrects the variable cost DY with use of a density value d. In order to distinguish between the corrected variable cost DY and the variable cost DY that is obtained by expressions (2) and (7), the variable cost DY obtained by expressions (2) and (7) will be called as the reference variable cost DYr. Off course, if adjustment with use of the density value d is not performed, the reference variable cost DYr is the variable cost DY. Here, the density value d is a value obtained by dividing the number of vehicles value n by the maximum value Z of the number of article transport vehicles 3 that can be present in the target link LA, as shown in the following expression (9).

$$d = n/Z \qquad (9)$$

For example, if the maximum value of the number of article transport vehicles 3 that can be present in the target link LA is 5, and the number of vehicles value n determined as described above is 6, the density value d is 1.2. As another example, if the maximum value of the number of article transport vehicles 3 that can be present in the target link LA is 5, and the number of vehicles value n determined as described above is 4, the density value d is 0.8.

The separation adjustment value Vi can be taken into consideration for the density value d as well. In that case, expression (9) is expressed as the following expression (10).

$$d = \frac{na + \sum_{i=1}^{nb} Vi}{Z} \qquad (10)$$

The second term of the numerator in expression (10) is an adjusted future number of vehicles value nc, which is the number of vehicles obtained by adjusting the future number of vehicles value nb according to the separation adjustment value Vi. Accordingly, the numerator of expression (10) corresponds to an "adjusted number of other vehicles", which obtained by adjusting the number of other vehicles 3B (target other vehicle 3D) in the target link LA (i.e., the number of vehicles value n) according to the separation adjustment value Vi. As shown in expression (10), the density value d adjusted according to the separation adjustment value Vi is a value obtained by dividing the adjusted number of other vehicles by the maximum value Z of the number of article transport vehicles 3 that can be present in the target link LA.

Here, in the case where the maximum value of the number of article transport vehicles 3 that can be present in the target link LA is 5, and the breakdown of "number of vehicles value n=4" is "current number of vehicles value na=2" and "future number of vehicles value nb=2", then the separation adjustment values Vi of the two other vehicles 3B counted in the future number of vehicles value nb are respectively "V1=0.5" and "V2=1". In this case, based on expression (10), the density value d is calculated as "0.7" as shown in the following expression (11).

$$d = \{na + (V1 + V2)\}/Z = 0.7 \qquad (11)$$

The density value d is a value representing the congestion level of the target link LA in consideration of the route length of the target link LA. As shown in the following expression (12), the link cost LC is determined based on the reference cost ST, the variable cost DY (reference variable cost DYr) corresponding to the number of vehicles value n, and the density value d. Note that as shown in expression (12), the second term "DYr d" on the right side is shown in the form of a product, and the second term as a whole may be considered to be the variable cost DY.

$$LC = ST + DYr \cdot d \qquad (12)$$

For example, if the reference cost ST is "10", the variable cost DY (reference variable cost DYr) is "20", and the density value d is "1.2", then the controller H sets link cost LC to "34", which is the sum of the reference cost ST and "24", which is a corrected value obtained by multiplying the variable cost DY by the density value d, as shown in expression (12). Note that if the density value d is not taken into consideration, the link cost LC is "30", which is the sum of "10" and "20". In other words, the controller H uses the density value d to correct the link cost LC such that the link cost LC increases as the density value d increases in the route setting control. The controller H corrects the link cost LC with use of the density value d for each of the target links LA that make up the candidate route 1B.

By correcting the link cost LC in this way, the congestion level of the target link LA, which depends on the maximum value of the number of article transport vehicles 3 that can be present in the target link LA (route length of the target link LA), can be reflected in the link cost LC. Then, by correcting the link cost LC so as to increase as the density value d increases, a candidate route 1B that includes a link L having a high density value d is not likely to be set as the set route 1A. Accordingly, it is possible to easily average the densities of article transport vehicles 3 present in the links L, and it is possible to reduce the possibility of frequent occurrence of traffic congestion in a specific link L.

Figure 14:
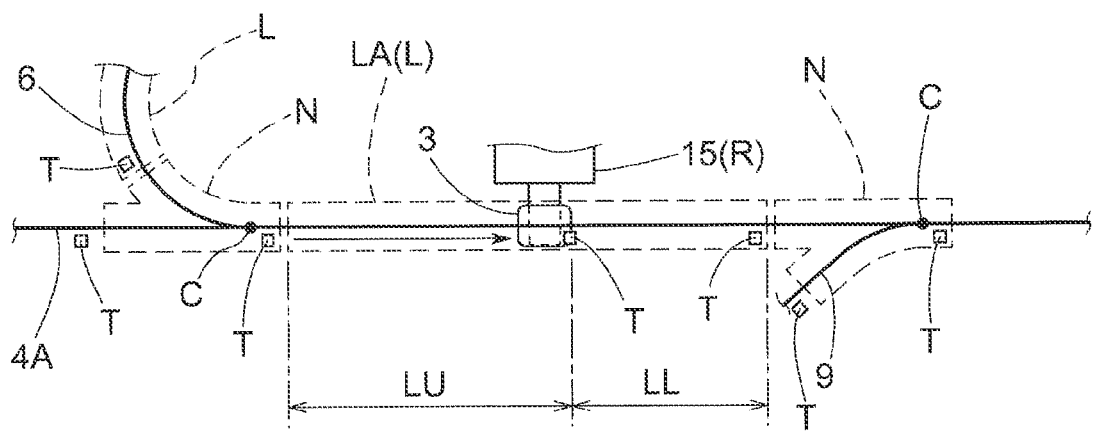
FIG. 14 is a diagram showing an upstream portion and a downstream portion of a target link.

Also, in the present embodiment, correction is performed on the link cost LC of the link L at the current position and the link L at the destination among the links L that belong to the candidate route 1B. As shown in FIG. 14, in the case of the link L at the current position, the reference transit time and the actual transit time are corrected based on the percentage of the region downstream of the destination in the link L (downstream region LL). Specifically, if the reference transit time is 5 seconds, the actual transit time is 20 seconds, and the percentage of the downstream region LL is 40%, then the reference transit time is corrected to 2 seconds, the actual transit time is corrected to 8 seconds, only the other vehicles 3B deemed to be present downstream of the current position in the target link LA are deemed to be other article transport vehicles 3 present in the target link LA when adjusting the current number of vehicles value na and correcting the number of vehicles value n. Also, in the case of the link L of the destination, the reference transit time and the actual transit time are corrected based on the percentage of the region upstream of the destination in the link L (upstream region LU). Specifically, if the reference transit time is 5 seconds, the actual transit time is 20 seconds, and the percentage of the upstream region LU is 60%, then the reference transit time is corrected to 3 seconds, the actual transit time is corrected to 12 seconds, only the other vehicles 3B deemed to be present upstream of the current position in the target link LA are deemed to be other article transport vehicles 3 present in the target link LA when adjusting the current number of vehicles value na and correcting the number of vehicles value n. In this way, in the case of the link L at the current position and the link L at the destination, the corrected reference transit time (reference cost ST), actual transit time, and number of vehicles value n are corrected when correcting the link cost LC.

Specifically, the controller H corrects the reference transit time and the actual transit time in the link L at the current position and the link L at the destination by a traveling region coefficient k for which the setting vehicle 3C travels in the links L at the start point and the end point in the candidate route 1B. As shown in the example shown in FIG. 14, if the percentage of the downstream region LL is 40% in the link L at the current position, "k=0.4" is set, and if the percentage of the upstream region LU is 60% in the link L at the destination, "k=0.6" is set. In other links L, "k=1". Accordingly, this can be expressed as the following expression (13).

$$LC=k(ST+DY) \quad (13)$$

In the above description, in the number of vehicles value n, the future number of vehicles value nb may differ from the actual value because other vehicles 3B may not actually pass through the target link LA. For example, the percentage of vehicles that actually pass through the target link LA may be different for other vehicles 3B located near the target link LA and other vehicles 3B located far from the target link LA. The farther other vehicles 3B are from the target link LA, the smaller the percentage of them that will pass through the target link LA, whereas the closer other vehicles 3B are to the target link LA, the greater the percentage of them that will pass through the target link LA. Given that the current number of vehicles value na indicates the number of other vehicles 3B present in the target link LA at the current time (at the set time for executing the route setting control #10), the weighting may be the same for each other vehicle 3B. However, because the future number of vehicles value nb includes other vehicles that may not be present in the target link LA at the current time, the weighting may be set differently for each of the other vehicles 3B according to the likelihood of being present, for example. As such weighting, the present embodiment gives the example of the separation adjustment value Vi, which is a value greater than 0 and less than or equal to 1. Hereinafter, the separation adjustment value Vi will be described.

Here, in the case where the setting time is the time when the route setting control #10 is executed, the reference other vehicle cost is a value set according to the amount of increase in the time required for the target vehicle 3A to pass through the target link LA per other vehicle 3B present in the target link LA. The reference other vehicle cost corresponds to the above-described time increase per vehicle ΔTn. Also, a target other vehicle 3D is another vehicle 3B for which the set route 1A passing through the target link LA after the setting time has been set. In the route setting control #10, the controller H obtains an adjusted other vehicle cost (ΔTn·Vi) by adjusting the reference other vehicle cost using the separation adjustment value Vi for each of the target other vehicle 3D, and obtains the variable cost DY based on the total (DYb) of the adjusted other vehicle costs for all of the target other vehicles 3D. The separation adjustment value Vi is a value set so as to decrease in a continuous or stepwise manner according to an increase in at least one separate index among a separation distance ND, which is the distance along the route from the position of the target other vehicle 3D at the setting time to the target link LA, a number of separation links NL, which is the number of links L along the route, and a number of separation nodes NN, which is the number of nodes N along the route.

Table 1 below shows an example of the case where the separation adjustment value Vi is set so as to decrease in a stepwise manner as the number of separation links NL increases. The setting reference value (=10) in the table is a reference value of reliability when counting as the future number of vehicles value nb. Here, the reliability has the property of a value that simulates a ratio of the actual passage of the target other vehicle 3D through the target link LA. Although this example illustrates an aspect in which the digits after the decimal point are rounded down such that the reliability is an integer, the values may be an integer obtained by rounding, or decimal values obtained by rounding down to the second decimal place or rounding. Also, Table 1 illustrates the case where the separation adjustment value Vi is set stepwise according to the number of separation links NL, but the description similarly applies to the case where the separation adjustment value Vi is set according to the separation distance ND or the number of separation nodes NN. Also, although Table 1 illustrates an aspect in which the separation adjustment value Vi is set stepwise, it may be set continuously according to the separation distance ND, the number of separation links NL, or the number of separation nodes NN. Given that a node N exists between the link L where the target other vehicle 3D is located and the next link L, the number of separation links NL and the number of separation nodes NN are substantially the same. Also, if the separation distance ND is used as the separation index, the lengths of the links L are also taken into consideration.

TABLE 1

| Number of separation links NL | Calculation of reliability with set reference value (=10) | Separation adjustment value Vi (inverse of reliability) |
|---|---|---|
| 1-5 | 1 + 5/10 = 1.5≈1 | 1/1 = 1 |
| 6-10 | 1 + 10/10 = 2 | 1/2 = 0.5 |
| 11 or more | 1 + 20/10 = 3 | 1/3 = 0.33 |

Figure 15:
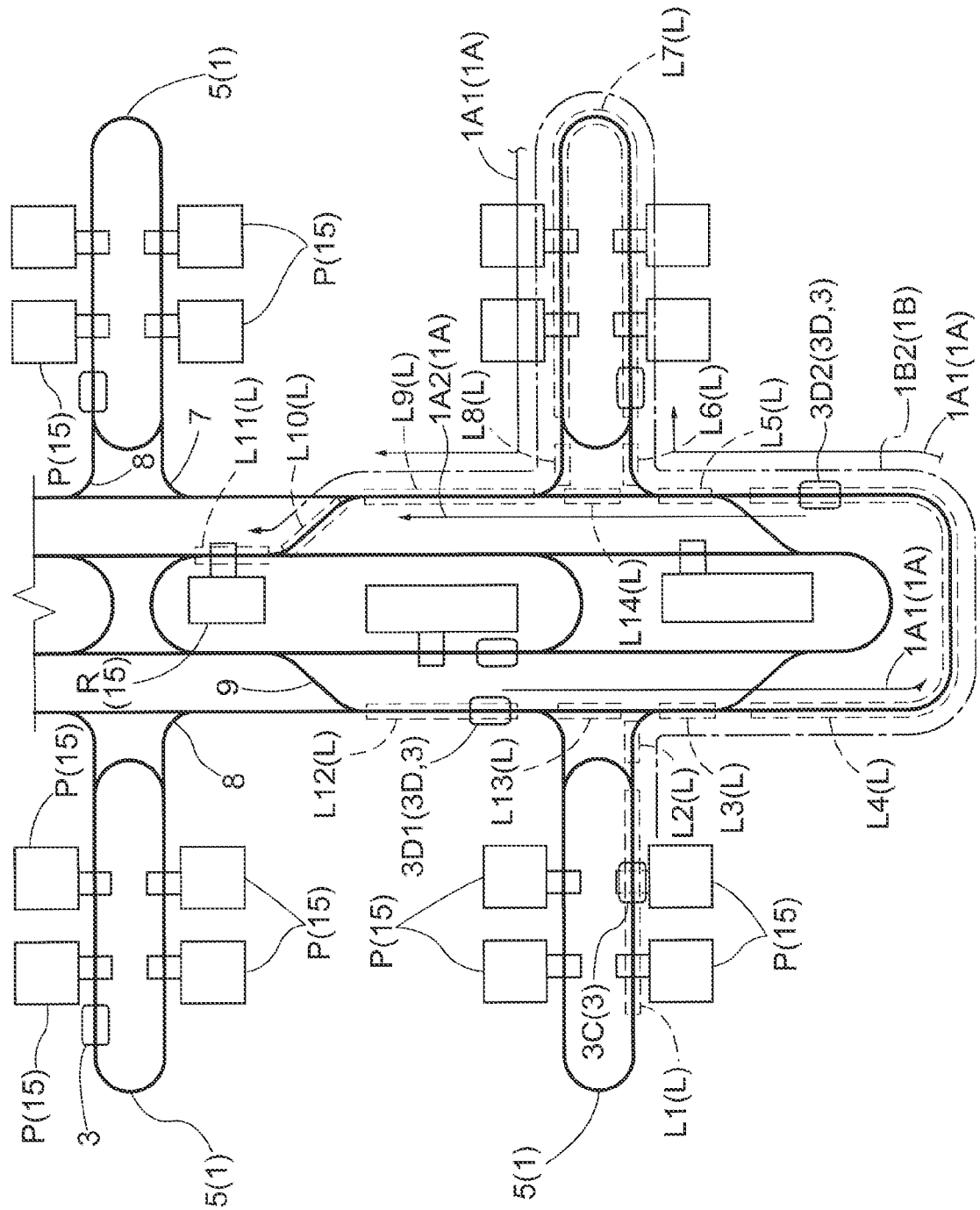
FIG. 15 is a diagram showing an example of the relationship between candidate routes and the set route of a target other vehicle.

FIG. 15 shows the positions of article transport vehicles 3 at the setting time, which is the time when the route setting control #10 for the setting vehicle 3C is executed. FIG. 15 illustrates the case where there are two target other vehicles 3D (first other vehicle 3D1 and second target other vehicle 3D2) for which the set route 1A was set so to pass through the target link LA included in one candidate route 1B (second candidate route 1B2 in FIG. 8) set for the setting vehicle 3C. The second candidate route 1B2 of the setting vehicle 3C is set to pass through 11 links L, namely first to eleventh links L1 to L11. A set route 1A passing through the twelfth link L12, the thirteenth link L13, and the third to ninth links L3 to L9 has been set for the first target other vehicle 3D1. The third to eleventh links L3 to L11 are overlapped with the second candidate route 1B2, and correspond to the target link LA in the candidate route 1B for the setting vehicle 3C. Also, the set route 1A passing through the fourth link L4, the fifth link L5, the fourteenth link L14, and the ninth link L9 has been set for the second target other vehicle 3D2. The fourth link L4, the fifth link L5, and the ninth link L9 are overlapped with the second candidate route 1B2, and correspond to the target link LA in the candidate route 1B for the setting vehicle 3C.

The fifth link L5 and the ninth link L9 are links L that are counted in the future number of vehicles value nb because both the first target other vehicle 3D1 and the second target other vehicle 3D2 pass through them. The fourth link L4 is also passed through by both the first target other vehicle 3D1 and the second target other vehicle 3D2, but at the current time (setting time), the second target other vehicle 3D2 is present in the fourth link L4. Accordingly, the second target other vehicle 3D2 is counted in the current number of vehicles value na instead of the future number of vehicles value nb in the fourth link L4.

Table 2 shows the relationship between the target link LA on the candidate route 1B of the setting vehicle 3C and the number of separation links NL, which is one of the separation indexes for the target other vehicle 3D. Specifically, the boxes that include numerical values show the number of separation links NL for each of the first target other vehicle 3D1 and the second target other vehicle 3D2 in the target link LA through which the first target other vehicle 3D1 or the second target other vehicle 3D2 passes, among the links L on the candidate route 1B of the setting vehicle 3C.

TABLE 2

| Candidate route of setting vehicle | | L1 | L2 | L3 | L4 | L5 | L6 | L7 | L8 | L9 | L10 | L11 |
|---|---|---|---|---|---|---|---|---|---|---|---|---|
| N | First target other vehicle | — | — | 2 | 3 | 4 | 5 | 6 | 7 | 8 | — | — |
| L | Second target other vehicle | — | — | — | 0 | 1 | — | — | — | 3 | — | — |

Here, consider the separation adjustment value Vi and the variable cost DY in the ninth link L9 through which both the first target other vehicle 3D1 and the second target other vehicle 3D2 pass. The twelfth link L12 is a link L in which the first target other vehicle 3D1 is present at the setting time, and the links after the thirteenth link L13 in the set route 1A (first other vehicle set route 1A1) of the first target other vehicle 3D1 are links L in which the first target other vehicle 3D1 is counted in the future number of vehicles value nb. The number of separation links NL between the twelfth link L12 and the thirteenth link L13 is "1". The ninth link L9 is the eighth link L when counting from the thirteenth link L13 in the set route 1A of the first target other vehicle 3D1. Accordingly, the number of separation links NL up to the ninth link L9 for the first target other vehicle 3D1 is "8", and the separation adjustment value Vi is "0.5" as shown in Table 1.

Similarly, the ninth link L9 is the third link L when counting from the fifth link L5 in the set route 1A of the second target other vehicle 3D2 (the second other vehicle set route 1A2). Accordingly, the number of separation links NL up to the ninth link L9 of the second target other vehicle 3D2 is "3", and the separation adjustment value Vi is "1" as shown in Table 1.

Here, assuming that there are only two target other vehicles 3D in the ninth link L9, and that the reference other vehicle cost (time increase per vehicle $\Delta Tn$) in the ninth link L9 is "50", the adjusted other vehicle cost in the ninth link L9 and the second variable cost DYb in the ninth link L9 for the first target other vehicle 3D1 and the second target other vehicle 3D2 are the values shown in Table 3 below.

TABLE 3

| Reference other vehicle cost (time increase per vehicle $\Delta Tn$) | Target other vehicle | Adjusted other vehicle cost ($\Delta Tn \cdot X$) | Second variable cost DYb |
|---|---|---|---|
| 50 | First target other vehicle | 50 × 0.5 = 25 | 25 + 50 = 75 |

If such an adjustment is not made, the future number of vehicles value nb is set to "2", and thus the second variable cost DYb is calculated as "100". Also, even if adjustment is performed, for example, in the fifth link L5, the number of separation links NL for both the first target other vehicle 3D1 and the second target other vehicle 3D2 is in the range of "1 to 5", and the value of the separation adjustment value Vi is "1" for both. Accordingly, the adjusted other vehicle cost for both the first target other vehicle 3D1 and the second target other vehicle 3D2 is "50", and the second variable cost DYb is calculated as "100".

In the above examples given with reference to expression (7) and Table 3, the controller H obtains the adjusted other vehicle cost for each target other vehicle 3D, and adds up the obtained costs to obtain the second variable cost DYb. However, the controller H may obtain the adjusted future number of vehicles value nc by adjusting the number of target other vehicles 3D in the future number of vehicles value nb according to the separation adjustment value Vi, and obtain the second variable cost DYb by multiplying the adjusted future number of vehicles value nc by the reference other vehicle cost (time increase per vehicle $\Delta Tn$). The adjusted future number of vehicles value nc is the second term of the numerator in expression (10), and expression (7) can be expressed as the following expression (14).

$$DY = DYa + DYb = \Delta Tn \cdot na + \Delta Tn \cdot \sum_{i=1}^{nb} Vi \qquad (14)$$

In this case, the first target other vehicle 3D1 is counted as 0.5 vehicles (=1 vehicle×0.5), the second target other vehicle 3D2 is counted as 1 vehicle (=1 vehicle×1), and the adjusted future number of vehicles value nc is "1.5". The second variable cost DYb is "75" as shown in the following expression (15), which is the same result as the value shown in Table 3.

$$DYb = \Delta Tn \cdot nc = 50 \times 1.5 = 75 \qquad (15)$$

Note that expression (7) can also be calculated as shown in the following expression (16) by using the adjusted number of other vehicles (the numerator of expression (10)) instead of the number of vehicles value n in expression (2) and expression (3). In other words, the variable cost DY may also be set by multiplying the time increase per vehicle ΔTn (reference other vehicle cost) by the adjusted number of other vehicles.

$$DY = \Delta Tn \cdot \left( na + \sum_{i=1}^{nb} Vi \right) \qquad (16)$$

In the above example given with reference to Table 1, the separation adjustment value Vi is a value set for each of a plurality of index sections obtained by dividing the total range of possible values of the separation index (the number of separation links 1 to 5, 6 to 10, and 11 or more), and the separation adjustment value Vi is set so as to gradually decrease as the range of values of the separation index included in the index section increases. However, such index classification is not required to be performed. In other words, the separation adjustment value Vi may be set so as to continuously decrease as the value of the separation index increases.

As described above, the percentage of the other vehicles 3B that actually pass through the target link LA is different between other vehicles 3B located near the target link LA and other vehicles 3B located far from the target link LA. The farther other vehicles 3B are from the target link LA, the smaller the percentage of them that will pass through the target link LA, whereas the closer other vehicles 3B are to the target link LA, the greater the percentage of them that will pass through the target link LA. Accordingly, the adjusted other vehicle cost tends to approach the actual influence of another vehicle 3B as the setting vehicle 3C approaches the target link LA. The controller H repeatedly executes the route setting control #10 at least at a regular time interval. In other words, the route setting is re-examined at a regular interval while the setting vehicle 3C is moving. Accordingly, for each link L in the set route, it is possible to improve the accuracy of the adjusted other vehicle cost for which the target link LA is a link L close to the setting vehicle 3C at the setting time.

Based on the link cost LC determined as described above, the controller H determines the route cost TC of each candidate route 1B. The route cost TC is a cost representing an estimated value of the time required for the setting vehicle 3C to travel on the candidate route 1B. In the present embodiment, the controller H determines the route cost TC for the candidate route 1B by adding the link costs LC for each of all of the links L that belong to the candidate route 1B and the node cost for each of all of the nodes N that belong to the candidate route 1B. The controller H then compares the route costs TC determined for the candidate routes 1B, and sets the candidate route 1B having the lowest route cost TC among the candidate routes 1B as the set route 1A. As a result, it is possible to appropriately consider the influence of other vehicles 3B present in the travelable route 1 and increase the likelihood that the route with the shortest time to reach the destination can be set as the set route 1A in the actual traveling situation.

Hereinafter, other embodiments will be described. It should be noted that the configurations of the embodiments described below are not limited to being applied independently, and can be applied in combination with the configurations of other embodiments as long as no contradiction arises.

(1) In the above description, an example is described in which the reference cost ST is set based on the transit time when the target vehicle 3A actually travels on the target link LA in a state where the other vehicles 3B are not present in the target link LA. However, the present invention is not limited to such a configuration. For example, a configuration is possible in which the reference cost ST is set based on the route length and the shape of the target link LA without actually causing the target vehicle 3A to travel. Specifically, a configuration is possible in which an ideal traveling speed for the article transport vehicle 3 is obtained for each of various positions based on the shape of the target link LA, the reference transit time of the target link LA for the article transport vehicle 3 is obtained based on the traveling speeds at the positions and the route length of the target link LA, and the reference cost ST is set based on the reference transit time.

(2) In the above description, an example is described in which the reference cost ST is set for each of all of the links L that belong to the travelable route 1 before the controller H executes route setting control the first time. However, the present invention is not limited to such a configuration. For example, a configuration is also favorable in which, even after transport of the article W is started in the article transport facility (after the operation is started), when the article transport vehicle 3 travels through the target link LA in a state where other vehicles 3B are not present, the transit time of the target link LA during such traveling is acquired as the reference transit time, and the reference cost ST is updated as necessary.

(3) In the above description, an example is described in which, when another vehicle 3B is present in the target link LA, the amount of increase in the actual transit time per other vehicle 3B, which is obtained by dividing the amount of increase in the actual transit time relative to the reference transit time by the number of vehicles indicated in the number of vehicles information, is used as the time increase per vehicle ΔTn. However, the present invention is not limited to such a configuration. For example, a configuration is possible in which the time increase per vehicle ΔTn is also calculated in a similar manner when no other vehicle 3B is present in the target link LA, and if the number of vehicles indicated by the number of vehicles information is 1 or more, the time increase per vehicle ΔTn is obtained by dividing the amount of increase by the number of vehicles indicated by the number of vehicles information, whereas if the number of vehicles indicated by the number of vehicles information is 0, the number of vehicles indicated by the number of vehicles information is set to 1 in order to avoid a denominator of 0 when obtaining the time increase per vehicle ΔTn. Alternatively, a configuration is possible in which a value obtained by adding 1 to the number of vehicles indicated in the number of vehicles information is always used, and the time increase per vehicle ΔTn is obtained by dividing the amount of increase amount by the resulting number of vehicles.

(4) In the above description, an example is described in which the time increase per vehicle ΔTn is the amount of increase in the actual transit time per other vehicle 3B relative to the reference transit time. However, the present invention is not limited to such a configuration. For example, a configuration is also favorable in which the time increase per vehicle ΔTn is expressed as a correlation map or a correlation expression for the amount of increase in the actual transit time relative to the reference transit time and the number of vehicles information. As a specific example, the time increase per vehicle ΔTn can also be a correlation map in which the horizontal axis indicates the number of other vehicles 3B, the vertical axis indicates the amount of increase in the actual transit time relative to the reference transit time, and the correlation relationship between them is expressed using a linear or non-linear graph or numerical table, or a correlation expression that indicates the relationship using an expression. In the case of such a configuration, the time increase per vehicle ΔTn can be set so as to express a non-linear correlation in which the rate of increase in the actual transit time gradually increases as the number of vehicles increases, such as being 3 seconds if the number of vehicles indicated by the number of vehicles information is 1, being 8 seconds if the number of vehicles is 2, and being 15 seconds if the number of vehicles is 3.

(5) In the above description, an example is described in which the link cost LC is corrected using the density value d. However, the present invention is not limited to such a configuration. For example, a configuration is possible in which the link cost LC is not corrected using the density value d. Also, the link cost LC may be corrected using a value representing the route length of the target link LA, for example. In this case, the link cost LC may be corrected such that the link cost LC decreases as the route length of the target link LA increases, for example. Alternatively, the link cost LC may be corrected using an index value other than those described above.

(6) In the above description, an example is described in which the density value d is multiplied by the variable cost DY (reference variable cost DYr) as shown in expression (12). However, as the density value d increases, the variable cost DY (reference variable cost DYr) becomes sufficiently larger than the reference cost ST, and thus the influence of the reference cost ST on the link cost LC becomes relatively small. Accordingly, the controller H may add the variable cost (e.g., 20) to the reference cost (e.g., 10), multiply the resulting value by the density value (e.g., 1.2) to obtain a corrected value (e.g., 36), and use the corrected value as the link cost LC. In other words, "LC=(ST+DYr) d" may be used instead of expression (12).

(7) In the above description, an example is described in which, when determining the route cost TC of the candidate route 1B, the node costs of the nodes N that belong to the candidate route 1B are added to the link costs LC of the links L that belong to the candidate route 1B. However, the present invention is not limited to such a configuration. For example, a configuration is possible in which the node cost is not taken into consideration when determining the route cost TC of the candidate route 1B. In this case, a configuration is also favorable in which only nodes N that do not have a route length are the connection points C, and the link L is the entirety of a route portion connecting a pair of adjacent connection points C.

(8) In the above description, an example is described in which the controller H determines the route cost TC of the candidate route 1B with use of the link costs LC of all of the links L that belong to the candidate route 1B. However, the present invention is not limited to such a configuration. For example, a configuration is possible in which the route cost TC is obtained based on the link costs LC of a portion of the links L that belong to the candidate route 1B, such as in the case where the route cost TC does not include the link costs LC of the link L that includes the current position of the setting vehicle 3C and the link cost LC of the link L that includes the destination.

(9) In the above description, an example is described in which the link cost LC is determined for each of all of the links L that belong to the candidate route 1B. However, the present invention is not limited to such a configuration. For example, a configuration is possible in which the controller H determines the link cost LC of each link L that belongs to the candidate route 1B in order to determine the route cost TC, and integrates the link costs LC along the candidate route 1B. In this case, if the integrated value exceeds a specified threshold value during the integration of the link costs LC, it is determined that the candidate route 1B is no longer a candidate for the set route 1A, and the calculation of subsequent link costs LC is discontinued. Note that it is preferable that the specified threshold value is set according to the distance from the current position to the destination.

(10) In the above description, an example is described in which when there are a plurality of candidate routes 1B, the route cost TC is obtained for all of the candidate routes 1B. However, the present invention is not limited to such a configuration. For example, a configuration is possible in which, in the case of a candidate route 1B whose total route length is a specified multiple or more of the shortest candidate route 1B, that candidate route 1B is not used as a candidate for the set route 1A, and the route cost TC is not obtained for that candidate route 1B.

(11) In the above description, an example is described in which the position information S of the article transport vehicle 3 is position information S read based on the detection object T. However, the present invention is not limited to such a configuration. A configuration is possible in which the position information S of the article transport vehicle 3 includes information on not only the position read based on the detection object T, but also the travel distance of the article transport vehicle 3 from that position. With this configuration, the controller H can acquire a more specific position of the article transport vehicle 3. Also, if the article transport vehicle 3 includes another position detector such as GPS (Global Positioning System), the position information S acquired by the position detector may be transmitted to the controller H.

(12) In the above description, an example is described in which the article transport vehicle 3 travels on the traveling rail 2 suspended from and supported by the ceiling. However, the present invention is not limited to such a configuration. For example, a configuration is possible in which the article transport vehicle 3 travels on the traveling rail 2 disposed in a manner other than being suspended from the ceiling, such as being supported on the floor surface. Also, instead of traveling on the traveling rail 2, the article transport vehicle 3 may travel in a trackless manner, such as traveling directly on the floor surface.

The following describes a summary of embodiments of the article transport facility described above.

In one aspect, an article transport facility includes a plurality of article transport vehicles configured to transport articles while traveling along a specified travelable route; and a controller configured to control the article transport vehicles, wherein the travelable route includes a plurality of nodes at which a route branches or routes merge, and a plurality of links that are each a route portion connecting a pair of nodes, the controller executes route setting control to set a set route based on a link cost set for each of the links, the set route being a route along which a setting vehicle, which is one of the plurality of article transport vehicles, travels to a destination on the travelable route, each of the link costs includes a reference cost and a variable cost, with a target vehicle being any one article transport vehicle that passes through a link, a target link being the link through which the target vehicle passes, and another vehicle being an article transport vehicle other than the target vehicle, the reference cost is a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, in the route setting control, the controller obtains an adjusted other vehicle cost by adjusting the reference other vehicle cost using the separation adjustment value for each target other vehicle, obtains the variable cost based on a sum of the adjusted other vehicle costs of all target other vehicles, determines the link cost for each link in a candidate route based on the variable cost and the reference cost, the candidate route being a candidate for the set route from the position of the setting vehicle at the setting time to the destination, obtains a route cost for each candidate route based on the link costs, and sets the set route based on the route cost of each candidate route.

According to this configuration, the target other vehicle is another vehicle for which a set route passing through the target link after the setting time has been set, and therefore the influence of not only other vehicles present in the target link at the setting time but also other vehicles that will be present in the target link in the future when the setting vehicle passes through the target link can be given consideration when obtaining the variable cost. Due to the reference other vehicle cost of the target other vehicle being reflected in the variable cost, it is possible to obtain a variable cost that is based on the state of the target link at a time point before the setting time. However, as the position of the target other vehicle at the setting time becomes farther from the target link, there is a gradually increasing likelihood that the set route of the target other vehicle will be changed to a route that does not pass through the target link due to a change in the situation before the target other vehicle reaches the target link. According to the above configuration, the adjusted other vehicle cost is obtained by adjusting the reference other vehicle cost with use of the separation adjustment value, which is a value that decreases with an increase in a separation index regarding the route from position of the target other vehicle at the setting time to the target link, and the variable cost is obtained based on a sum of the adjusted other vehicle costs for all of the target other vehicles, and therefore the variable cost can be obtained more appropriately with consideration given to the possibility of a future change in the set route of a target other vehicle. This therefore makes it easier to raise the likelihood that the set route can be set to a route that reaches the destination in a short time from among a plurality of candidate routes.

Various technical features of this article transport facility can also be applied to a route setting method and a route setting program for route setting in the article transport facility, and also to a recording medium (a computer-readable recording medium) on which the route setting program is recorded. The following illustrates representative aspects. For example, the route setting method can include various steps that have the features of the article transport facility described above. Also, a route setting program and a storage medium storing the route setting program can cause a controller, which is a computer, to realize various functions having the above-described features of the article transport facility. As a matter of course, the aforementioned route setting method, route setting program, and recording medium having the route setting program recorded thereon can also achieve actions and effects of the article transport facility described above. Also, as preferred embodiments of the article transport facility, various additional features shown below can also be incorporated into the route setting method, the route setting program, and the recording medium, and the method, the program, and the recording medium can also achieve actions and effects corresponding to the additional features.

As one preferred aspect, a route setting method is for, in an article transport facility that includes a plurality of article transport vehicles that transport articles while traveling along a specified travelable route and a controller that controls the article transport vehicles, setting a set route for causing a setting vehicle, which is one of the article transport vehicles, to travel to a destination on the travelable route, by causing the controller to execute route setting control, the travelable route including a plurality of nodes at which a route branches or routes merge, and a plurality of links that are each a route portion connecting a pair of nodes, a link cost set for each of the links including a reference cost and a variable cost, with a target vehicle being any one article transport vehicle that passes through a link, a target link being the link through which the target vehicle passes, and another vehicle being an article transport vehicle other than the target vehicle, the reference cost being a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, the route setting method including: a step of obtaining an adjusted other vehicle cost for each target other vehicle with use of the reference other vehicle cost and the separation adjustment value; a step of obtaining the variable cost based on a sum of the adjusted other vehicle costs of all target other vehicles; a step of determining the link cost for each link in a candidate route based on the variable cost and the reference cost, the candidate route being a candidate for the set route from the position of the setting vehicle at the setting time to the destination; and obtaining a route cost for each candidate route based on the link costs, and setting the set route based on the route cost of each candidate route.

Also, as another preferred aspect, a route setting program is for, in an article transport facility that includes a plurality of article transport vehicles that transport articles while traveling along a specified travelable route and a controller that controls the article transport vehicles, causing the controller to realize a function for setting a set route for causing a setting vehicle, which is one of the article transport vehicles, to travel to a destination on the travelable route, by execution of route setting control by the controller, the travelable route including a plurality of nodes at which a route branches or routes merge, and a plurality of links that are each a route portion connecting a pair of nodes, a link cost set for each of the links including a reference cost and a variable cost, with a target vehicle being any one article transport vehicle that passes through a link, a target link being the link through which the target vehicle passes, and another vehicle be an article transport vehicle other than the target vehicle, the reference cost being a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, the route setting program causing the controller to realize: a function of obtaining an adjusted other vehicle cost for each target other vehicle with use of the reference other vehicle cost and the separation adjustment value; a function of obtaining the variable cost based on a sum of the adjusted other vehicle costs of all target other vehicles; a function of determining the link cost for each link in a candidate route based on the variable cost and the reference cost, the candidate route being a candidate for the set route from the position of the setting vehicle at the setting time to the destination; and a function of obtaining a route cost for each candidate route based on the link costs, and setting the set route based on the route cost of each candidate route.

Also, as another preferred aspect, a storage medium has recorded thereon a route setting program for, in an article transport facility that includes a plurality of article transport vehicles that transport articles while traveling along a specified travelable route and a controller that controls the article transport vehicles, causing the controller to realize a function for setting a set route for causing a setting vehicle, which is one of the article transport vehicles, to travel to a destination on the travelable route, by execution of route setting control by the controller, the travelable route including a plurality of nodes at which a route branches or routes merge, and a plurality of links that are each a route portion connecting a pair of nodes, a link cost set for each of the links including a reference cost and a variable cost, with a target vehicle being any one article transport vehicle that passes through a link, a target link being the link through which the target vehicle passes, and another vehicle be an article transport vehicle other than the target vehicle, the reference cost being a value set based on a reference transit time indicating an amount of time required for the target vehicle to pass through the target link while the other vehicle is not present in the target link, with a setting time being a time at which the route setting control is executed, with a reference other vehicle cost being a value set according to an amount by which the time required for the target vehicle to pass through the target link increases per other vehicle present in the target link, with a target other vehicle being another vehicle for which a set route that passes through the target link at or after the setting time has been set, and with a separation adjustment value being a value set so as to decrease in a continuous or stepwise manner as a separation index increases, the separation index being at least one among a separation distance indicating a distance along a route from a position of the target other vehicle at the setting time to the target link, a number of separation links indicating the number of links along the route, and a number of separation nodes indicating the number of nodes along the route, the route setting program causing the controller to realize: a function of obtaining an adjusted other vehicle cost for each target other vehicle with use of the reference other vehicle cost and the separation adjustment value; a function of obtaining the variable cost based on a sum of the adjusted other vehicle costs of all target other vehicles; a function of determining the link cost for each link in a candidate route based on the variable cost and the reference cost, the candidate route being a candidate for the set route from the position of the setting vehicle at the setting time to the destination; and a function of obtaining a route cost for each candidate route based on the link costs, and setting the set route based on the route cost of each candidate route.

Here, it is preferable that the controller obtains an adjusted number of other vehicles by adjusting the number of target other vehicles according to the separation adjustment value, obtains a density value by dividing the adjusted number of other vehicles by a maximum value of the number of article transport vehicles that can be present in the target link, and corrects the link cost in the route setting control such that the link cost increases as the density value increases.

According to this configuration, the congestion level of the target link, which is in determined according to the maximum value of the number of article transport vehicles that can be present in the target link, can be reflected in the link cost. Also, the link cost can be corrected such that the link cost increases as the density value increases, thus making it unlikely for a candidate route that includes a link having a high density value from being set as the set route.

Accordingly, it is possible to easily average the densities of the article transport vehicles present in each link, and it is possible to reduce the likelihood of frequent congestion in a specific link.

Also, it is preferable that the separation adjustment value is a value set for each of a plurality of index sections obtained by dividing a total range of possible values of the separation index into sections, and the separation adjustment value is set so as to increase in a stepwise manner as the range of values of the separation index included in an index section increases.

According to this configuration, the separation adjustment value is a stepwise value, thus making it possible to simplify the process of obtaining the adjusted other vehicle cost.

Here, it is preferable that, with an actual transit time being an amount of time required for the target vehicle to pass through the target link in an actual traveling state in which the target vehicle travels in the target link while another vehicle is present in the target link, the controller causes the target vehicle to travel through the target link a plurality of times while another vehicle is present in the target link, acquires the actual transit time and number of vehicles information indicating the number of other vehicles present in the target link for each of the plurality of times, and sets the reference other vehicle cost based on a correlation between the number of vehicles information and an amount of increase in the actual transit time relative to the reference transit time.

The actual time required for the target vehicle to pass through the target link changes depending on the traveling speed and acceleration/deceleration of the target vehicle in the target link, the traveling speed and acceleration/deceleration of other vehicles in the target link, the number of other vehicles, the distances between vehicles, and the like. According to the above configuration, the target vehicle is caused to travel through the target link a plurality of times while another vehicle is present in the target link, and the number of vehicles information and the actual transit time are acquired each time, thus making it possible to acquire information indicating the relationship between the number of vehicles information and the actual transit time in various situations. By obtaining the time increase per vehicle based on the correlation between the number of vehicles information and the amount of increase in the actual transit time relative to the reference transit time, which is obtained from the aforementioned information, it is possible to obtain a reference other vehicle cost (amount of increase in transit time that corresponds to the number of vehicles in the target link) that reflects various situations.

Also, it is preferable that the controller sets the reference other vehicle cost according to an amount of increase in the actual transit time per other vehicle that is obtained by dividing the amount of increase in the actual transit time relative to the reference transit time by the number of vehicles indicated in the number of vehicles information.

According to this configuration, the reference other vehicle cost is a value indicating the amount of increase in the actual transit time per other vehicle, thus making it possible to obtain the variable cost based on a value obtained by multiplying the reference other vehicle cost by the number of vehicles. Accordingly, the variable cost can be calculated easily.

Also, it is preferable that each of the article transport vehicles transmits position information indicating a position of the article transport vehicle to the controller, and the controller stores the position information received from the article transport vehicles in association with a time of reception in a storage unit, and acquires the number of vehicles information and the actual transit time based on positions of the article transport vehicles at various times, the positions being obtained based on information stored in the storage unit.

The article transport vehicle often has a function of transmitting position information to the controller, and the controller often has a time management function and a storage unit for storing information. According to the above configuration, by using the function of transmitting the position information of the article transport vehicle to the controller as well as the time management function and the storage unit of the controller, it is possible to acquire the number of vehicles information and the actual transit time without adding a new function to the article transport vehicle or the controller.

Also, it is preferable that when setting the reference other vehicle cost with use of the number of vehicles information and the actual transit times, the controller excludes number of vehicles information and an actual transit time that correspond to traveling of the target vehicle when a problem occurred, and number of vehicles information and an actual transit time that correspond to traveling of the target vehicle through a target link in which traveling is limited due to occurrence of a problem.

If the passage of the target vehicle through the target link is obstructed due to an abnormal stop of another vehicle, an obstacle present during passage through the target link, or the like, or if an abnormality occurs in the target vehicle and the target vehicle stops or decelerates, the actual transit time for the target vehicle to pass through the target link becomes significantly longer. In other words, if the number of vehicles information and the actual transit time obtained during such traveling are used for setting the reference other vehicle cost, the reference other vehicle cost is set to a value larger than what the value actually is. According to this configuration, the number of vehicles information and the actual transit time that correspond to such traveling are excluded from usage when setting the reference other vehicle cost, thus making it possible to set a more appropriate reference other vehicle cost.

Also, it is preferable that the controller repeatedly executes the route setting control at at least a regular interval.

The adjusted other vehicle cost tends to approach the actual influence of another vehicle as the setting vehicle approaches the target link. If the route setting control is repeatedly executed at a regular interval, the route setting is re-examined at a regular interval while the setting vehicle is moving. Accordingly, for each link in the set route, it is possible to improve the accuracy of the adjusted other vehicle cost for which the target link is a link close to the setting vehicle at each point in time. As a result, it is possible to set the route with higher accuracy in consideration of the influence of other vehicles.

What is claimed is:

1. An article transport facility comprising:
 a plurality of article transport vehicles configured to transport articles while traveling along a specified travelable route; and
 a controller configured to control the article transport vehicles,
 wherein:
 the travelable route includes a plurality of nodes at which a route branches or routes merge, and a plurality of links that are each a route portion connecting a pair of nodes, the controller executes route setting control to set a set route based on a link cost set for each of the links, the set route is a route along which a setting vehicle, which is one of the plurality of article transport vehicles, travels to a destination on the travelable route, each of the link costs includes a reference cost and a variable cost, a target vehicle is any one article transport vehicle that passes through a link, a target link is the link through which the target vehicle passes, and another vehicle is an article transport vehicle other than the target vehicle, the reference cost is a value set based on a reference transit time indicating an amount of time required for the target vehicle to pass through the target link while the other vehicle is not present in the target link, a setting time is a time at which the route setting control is executed, a reference other vehicle cost is a value set according to an amount by which the time required for the target vehicle to pass through the target link increases per other vehicle present in the target link, a target other vehicle is another vehicle for which a set route that passes through the target link at or after the setting time has been set, and a separation adjustment value is a value set so as to decrease in a continuous or stepwise manner as a separation index increases, the separation index is at least one among a separation distance indicating a distance along a route from a position of the target other vehicle at the setting time to the target link, a number of separation links indicating the number of links along the route, and a number of separation nodes indicating the number of nodes along the route, in the route setting control, the controller obtains an adjusted other vehicle cost by adjusting the reference other vehicle cost using the separation adjustment value for each target other vehicle, obtains the variable cost based on a sum of the adjusted other vehicle costs of all target other vehicles, determines the link cost for each link in a candidate route based on the variable cost and the reference cost, the candidate route is a candidate for the set route from the position of the setting vehicle at the setting time to the destination, obtains a route cost for each candidate route based on the link costs, and sets the set route based on the route cost of each candidate route.

2. The article transport facility according to claim 1, wherein the controller obtains an adjusted number of other vehicles by adjusting the number of target other vehicles according to the separation adjustment value, obtains a density value by dividing the adjusted number of other vehicles by a maximum value of the number of article transport vehicles that can be present in the target link, and corrects the link cost in the route setting control such that the link cost increases as the density value increases.

3. The article transport facility according to claim 1, wherein the separation adjustment value is a value set for each of a plurality of index sections obtained by dividing a total range of possible values of the separation index into sections, and the separation adjustment value is set so as to increase in a stepwise manner as the range of values of the separation index included in an index section increases.

4. The article transport facility according to claim 1, wherein with an actual transit time is an amount of time required for the target vehicle to pass through the target link in an actual traveling state in which the target vehicle travels in the target link while another vehicle is present in the target link, wherein the controller causes the target vehicle to travel through the target link a plurality of times while another vehicle is present in the target link, acquires the actual transit time and number of vehicles information indicating the number of other vehicles present in the target link for each of the plurality of times, and sets the reference other vehicle cost based on a correlation between the number of vehicles information and an amount of increase in the actual transit time relative to the reference transit time.

5. The article transport facility according to claim 4, wherein the controller sets the reference other vehicle cost according to an amount of increase in the actual transit time per other vehicle that is obtained by dividing the amount of increase in the actual transit time relative to the reference transit time by the number of vehicles indicated in the number of vehicles information.

6. The article transport facility according to claim 4, wherein each of the article transport vehicles transmits position information indicating a position of the article transport vehicle to the controller, and wherein the controller stores the position information received from the article transport vehicles in association with a time of reception in a storage unit, and acquires the number of vehicles information and the actual transit time based on positions of the article transport vehicles at various times, the positions are obtained based on information stored in the storage unit.

7. The article transport facility according to claim 4, wherein when setting the reference other vehicle cost with use of the number of vehicles information and the actual transit times, the controller excludes number of vehicles information and an actual transit time that correspond to traveling of the target vehicle when a problem occurred, and number of vehicles information and an actual transit time that correspond to traveling of the target vehicle through a target link in which traveling is limited due to occurrence of a problem.

8. The article transport facility according to claim 1, wherein the controller repeatedly executes the route setting control at least at a regular interval.

9. A route setting method for, in an article transport facility that comprises a plurality of article transport vehicles that transport articles while traveling along a specified travelable route and a controller that controls the article transport vehicles, setting a set route for causing a setting vehicle, which is one of the article transport vehicles, to travel to a destination on the travelable route, by causing the controller to execute route setting control, the travelable route including a plurality of nodes at which a route branches or routes merge, and a plurality of links that are each a route portion connecting a pair of nodes, a link cost set for each of the links including a reference cost and a variable cost, wherein:

a target vehicle is any one article transport vehicle that passes through a link, a target link is the link through which the target vehicle passes, and another vehicle is an article transport vehicle other than the target vehicle, the reference cost is a value set based on a reference transit time indicating an amount of time required for the target vehicle to pass through the target link while the other vehicle is not present in the target link, a setting time is a time at which the route setting control is executed, a reference other vehicle cost is a value set according to an amount by which the time required for the target vehicle to pass through the target link increases per other vehicle present in the target link, a target other vehicle is another vehicle for which a set route that passes through the target link at or after the setting time has been set, and a separation adjustment value is a value set so as to decrease in a continuous or stepwise manner as a separation index increases, the separation index is at least one among a separation distance indicating a distance along a route from a position of the target other vehicle at the setting time to the target link, a number of separation links indicating the number of links along the route, and a number of separation nodes indicating the number of nodes along the route, the route setting method comprising:

obtaining an adjusted other vehicle cost for each target other vehicle with use of the reference other vehicle cost and the separation adjustment value;

obtaining the variable cost based on a sum of the adjusted other vehicle costs of all target other vehicles;

determining the link cost for each link in a candidate route based on the variable cost and the reference cost, the candidate route is a candidate for the set route from the position of the setting vehicle at the setting time to the destination; and obtaining a route cost for each candidate route based on the link costs, and setting the set route based on the route cost of each candidate route.

10. A route setting program product comprising at least one non-transitory computer-readable storage medium including instructions for, in an article transport facility that comprises a plurality of article transport vehicles that transport articles while traveling along a specified travelable route and a controller that controls the article transport vehicles, causing the controller to set a set route for causing a setting vehicle, which is one of the article transport vehicles, to travel to a destination on the travelable route, by execution of route setting control by the controller, the travelable route including a plurality of nodes at which a route branches or routes merge, and a plurality of links that are each a route portion connecting a pair of nodes, a link cost set for each of the links including a reference cost and a variable cost, wherein:

a target vehicle is any one article transport vehicle that passes through a link, a target link is the link through which the target vehicle passes, and another vehicle is an article transport vehicle other than the target vehicle, the reference cost is a value set based on a reference transit time indicating an amount of time required for the target vehicle to pass through the target link while the other vehicle is not present in the target link, a setting time is a time at which the route setting control is executed, a reference other vehicle cost is a value set according to an amount by which the time required for the target vehicle to pass through the target link increases per other vehicle present in the target link, a target other vehicle is another vehicle for which a set route that passes through the target link at or after the setting time has been set, and a separation adjustment value is a value set so as to decrease in a continuous or stepwise manner as a separation index increases, the separation index is at least one among a separation distance indicating a distance along a route from a position of the target other vehicle at the setting time to the target link, a number of separation links indicating the number of links along the route, and a number of separation nodes indicating the number of nodes along the route, the route setting program, when executed by the controller, causes the controller to:

obtain an adjusted other vehicle cost for each target other vehicle with use of the reference other vehicle cost and the separation adjustment value;

obtain the variable cost based on a sum of the adjusted other vehicle costs of all target other vehicles;

determine the link cost for each link in a candidate route based on the variable cost and the reference cost, the candidate route is a candidate for the set route from the position of the setting vehicle at the setting time to the destination; and obtain a route cost for each candidate route based on the link costs, and setting the set route based on the route cost of each candidate route.

* * * * *